United States Patent
Kuwahara et al.

(10) Patent No.: US 9,041,596 B2
(45) Date of Patent: *May 26, 2015

(54) MULTIBEAM RADAR APPARATUS FOR VEHICLE, MULTIBEAM RADAR METHOD AND MULTIBEAM RADAR PROGRAM

(75) Inventors: Yoshihiko Kuwahara, Hamamatsu (JP); Junji Kanamoto, Yokohama (JP); Hiroyuki Kamo, Yokohama (JP)

(73) Assignees: National University Corporation Shizuoka University, Shizuoka (JP); Honda Elesys Co., Ltd, Kanagawa (JP)

( * ) Notice: Subject to any disclaimer, the term of this patent is extended or adjusted under 35 U.S.C. 154(b) by 362 days.

This patent is subject to a terminal disclaimer.

(21) Appl. No.: 13/371,047

(22) Filed: Feb. 10, 2012

(65) Prior Publication Data

US 2012/0274501 A1    Nov. 1, 2012

Related U.S. Application Data

(60) Provisional application No. 61/441,828, filed on Feb. 11, 2011.

(30) Foreign Application Priority Data

Aug. 24, 2011 (JP) ................ P2011-183055

(51) Int. Cl.
*G01S 3/74* (2006.01)
*G01S 13/42* (2006.01)
(Continued)

(52) U.S. Cl.
CPC . *G01S 3/74* (2013.01); *G01S 13/42* (2013.01); *G01S 13/48* (2013.01); *G01S 13/931* (2013.01)

(58) Field of Classification Search
CPC ......... G01S 3/74; G01S 13/48; G01S 13/931; G01S 13/42
USPC ........................................... 342/196
See application file for complete search history.

(56) References Cited

U.S. PATENT DOCUMENTS 6,351,238 B1 * 2/2002 Kishigami et al. ............ 342/445
6,897,807 B2 * 5/2005 Kishigami et al. ............ 342/417
(Continued)

FOREIGN PATENT DOCUMENTS

JP    2006-275840 A    10/2006
JP    2006-308542 A    11/2006
(Continued)

OTHER PUBLICATIONS

Maruyama et al.,"Design of Multibeam Dielectric Lens Antennas by Multiobjective Optimization", IEEE Transactions on Antennas and Propagation, vol. 57 No. 1, pp. 57-63, 2009.
(Continued)

*Primary Examiner* — Matthew M Barker
(74) *Attorney, Agent, or Firm* — Keating & Bennett, LLP

(57) ABSTRACT

An on-board multibeam radar apparatus includes a plurality of beam elements that constitute an antenna transmitting a transmission wave and receiving an incoming wave reflected by and arriving from a target in response to the transmission wave, and a processing unit configured to apply a Fourier transformation to beam element data which are data of a received wave received through the plurality of beam elements based on the number of elements and the element interval of a desired virtual array antenna so as to create virtual array data, and to perform a predetermined process based on the created virtual array data.

3 Claims, 19 Drawing Sheets

(51) Int. Cl.
*G01S 13/48* (2006.01)
*G01S 13/93* (2006.01)

(56) References Cited

U.S. PATENT DOCUMENTS

| | | | |
|---|---|---|---|
| 7,504,990 B2* | 3/2009 | Isaji | 342/109 |
| 8,077,076 B2* | 12/2011 | Walter et al. | 342/70 |
| 8,144,049 B2* | 3/2012 | Mizutani et al. | 342/147 |
| 8,264,399 B2* | 9/2012 | Shinomiya et al. | 342/74 |
| 8,451,165 B2* | 5/2013 | Puzella et al. | 342/70 |
| 2004/0125012 A1* | 7/2004 | Okamura et al. | 342/81 |
| 2005/0280572 A1* | 12/2005 | Shima | 342/70 |
| 2006/0220952 A1* | 10/2006 | Aoki | 342/175 |
| 2007/0152868 A1* | 7/2007 | Schoebel | 342/70 |
| 2009/0303108 A1 | 12/2009 | Hilsebecher et al. | |
| 2011/0095937 A1* | 4/2011 | Klar et al. | 342/70 |
| 2012/0105269 A1* | 5/2012 | Klar et al. | 342/70 |

FOREIGN PATENT DOCUMENTS

| | | |
|---|---|---|
| JP | 4098311 B2 | 3/2008 |
| JP | 4098318 B2 | 3/2008 |
| JP | 2009-156582 A | 7/2009 |
| JP | 2009-541725 A | 11/2009 |

OTHER PUBLICATIONS

Kikuma Nobuyoshi., "Adaptive Antenna Technology", Ohm Sha, 2003, pp. 158-165.
Kikuma Nobuyoshi., Kagaku Gijutsu Shyuppan, "Adaptive Signal Processing Using Array Antennas," 1998, pp. 173-179, pp. 162-169, pp. 194-205.

* cited by examiner

MULTIBEAM RADAR APPARATUS FOR VEHICLE, MULTIBEAM RADAR METHOD AND MULTIBEAM RADAR PROGRAM

CROSS-REFERENCE TO RELATED APPLICATIONS

This application is a Non-provisional patent application of U.S. Provisional Patent Application No. 61/441,828, filed Feb. 11, 2011, and claims priority on Japanese Patent Application No. 2011-183055, filed Aug. 24, 2011, the contents of which are entirely incorporated herein by reference.

BACKGROUND OF THE INVENTION

1. Field of the Invention

The present invention relates to an on-board multibeam radar apparatus, a multibeam radar method, and a multibeam radar program, which can detect a target using a reflected wave from the target in response to a transmitted wave.

2. Background Art

In recent years, on-board detection apparatuses measuring the distance, the relative velocity, and the azimuth between a vehicle and another vehicle (which is also referred to as a reflecting object, an object, or a target) using a millimeter wave radar or the like have been practically used. As on-board radars, an FMCW (Frequency Modulated Continuous Wave) radar, a multi-frequency CW (Continuous Wave) radar, a pulse radar, and the like have been known.

In such on-board radars, a spectrum estimating method using a high-resolution algorithm, such as an AR spectrum estimating method (including a maximum entropy method or a linear prediction method) and a MUSIC (MUltiple SIgnal Classification) method which can achieve a high resolution with a small number of channels, has been used as a signal processing technique of detecting the direction of an arrival wave (a received wave) from a target (a reflecting object) (see JP-A-2009-156582 (Patent Document 1) and Japanese Patent No. 4098311).

Here, a multibeam radar apparatus (also referred to as a beam space system) is known with respect to an electronic scanning radar apparatus of an array antenna system (also referred to as an element space system).

In recent years, dielectric lens antennas have been studied for the multibeam system (for example, see Design of Multibeam Dielectric Lens Antennas by Multiobjective Optimization/IEEE Trans. AP Vol. 57 No. 1, pp. 57-63, 2009, Shizuoka University). Regarding on-board multibeam radar apparatuses, radar apparatuses using a dielectric lens antenna have been developed (for example, see JP-T-2009-541725).

Since the multibeam system represented by a dielectric lens antenna can embody high-gain/high-efficiency antennas more easily than the array antenna system, it is easier to detect a target with a small RCS (Radar Cross Section) even in environments with a low SNR (Signal to Noise Ratio).

Depending on the shape of a lens or the arrangement of primary feeds (primary radiators) and because of no grating lobe occurring, it is possible to flexibly design multibeam radars with various FOVs (Fields Of View) or various gain properties.

SUMMARY OF THE INVENTION

In recent years, in on-board radars using millimeter waves or microwaves, there has been a need for the resolution of multiple targets (a plurality of targets) present within the same measurement point (for example, the same distance point or bin in the FMCW type), the improvement in angle measurement accuracy. In this regard, in the case of a radar of the array antenna system, an effort is made by using a beam forming process in which multi beams can be formed through a signal processing, as well as a high-resolution algorithm such as an AR spectrum estimating method and the MUSIC method (refer, for example, to Patent Documents 1 and 2).

However, since the angle-measuring method is basically of an amplitude monopulse type method in the conventional multibeam radar, it is necessary to reduce a beam width and to increase the number of beams in order to improve angle measurement accuracy for multiple targets present at the same measurement point. In practice, the small beam width and the large number of beams are limited from the viewpoint of structure and cost, and the resolution or the angle measurement accuracy of multiple targets at the same measurement point is inferior to that in the array antenna system.

The present invention is made in consideration of such circumstances, and an object thereof is to provide an on-board multibeam radar apparatus, a multibeam radar method, and a multibeam radar program, which can detect a target with a high accuracy.

To achieve the above-mentioned object, according to a first aspect of the invention, there is provided an on-board multibeam radar apparatus including: a plurality of beam elements that constitute an antenna transmitting a transmission wave and receiving an incoming wave reflected by and arriving from a target in response to the transmission wave; and a processing unit configured to apply a Fourier transformation to beam element data which are data of a received wave received through the plurality of beam elements based on the number of elements and the element interval of a desired virtual array antenna so as to create virtual array data, and to perform a predetermined process based on the created virtual array data.

In the on-board multibeam radar apparatus, the processing unit may be configured to perform a process of detecting an azimuth of the target based on the created virtual array data as the predetermined process.

The on-board multibeam radar apparatus may further include a lens that passes the transmission wave transmitted from and the received wave received by the plurality of beam elements, and the plurality of elements constituting the virtual array antenna may be arranged so that all the elements are within an aperture of a virtual lens corresponding to the lens.

The on-board multibeam radar apparatus may further include a lens that passes the transmission wave transmitted from and the received wave received by the plurality of beam elements, and the plurality of elements constituting the virtual array antenna may be arranged so that the width of an aperture of a virtual lens corresponding to the lens is equal to the width between the elements at both end.

In the on-board multibeam radar apparatus, the processing unit may be configured to apply the Fourier transformation to the beam element data at a searching incident angle corresponding to the beam element data which are data of the received wave received by the plurality of beam elements based on the element number and the element interval of the desired virtual array antenna and creates a steering vector used to detect an azimuth.

In the on-board multibeam radar apparatus, the processing unit may be configured to apply a unitary transformation to a correlation matrix based on the created virtual array data, to apply a unitary transformation to the steering vector, and to perform the predetermined process based on the result of the unitary transformation.

To achieve the above-mentioned object, according to a second aspect of the invention, there is provided a multibeam radar method including: causing a plurality of beam elements constituting an antenna to transmit a transmission wave and to receive an incoming wave reflected by and arriving from a target in response to the transmission wave; and causing a processing unit to apply a Fourier transformation to beam element data which are data of a received wave received through the plurality of beam elements based on the number of elements and the element interval of a desired virtual array antenna to create virtual array data and to perform a predetermined process based on the created virtual array data.

To achieve the above-mentioned object, according to a third aspect of the invention, there is provided a multibeam radar program causing a computer to perform: a step of causing a plurality of beam elements constituting an antenna to transmit a transmission wave and to receive an incoming wave reflected by and arriving from a target in response to the transmission wave; and, a step of causing a processing unit to apply a Fourier transformation to beam element data which are data of a received wave received through the plurality of beam elements based on the number of elements and the element interval of a desired virtual array antenna to create virtual array data and to perform a predetermined process based on the created virtual array data.

According to the invention, it is possible to provide an on-board multibeam radar apparatus, a multibeam radar method, and a multibeam radar program, which can detect a target with a high accuracy.

DETAILED DESCRIPTION OF THE INVENTION

[First Embodiment]
<Constitution of Multibeam Radar Apparatus>

Figure 1:
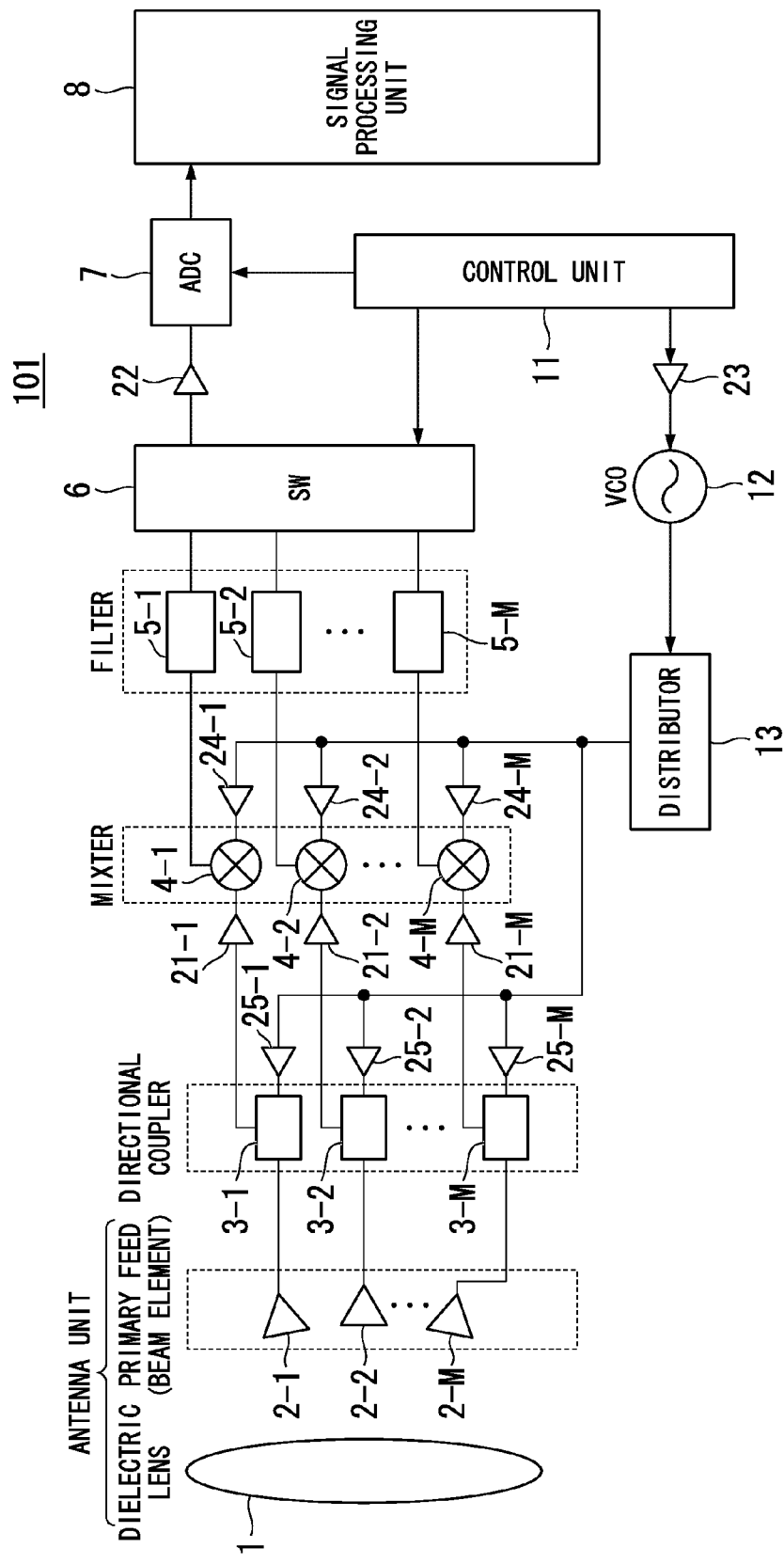
FIG. 1 is a block diagram illustrating the constitution of an on-board multibeam radar apparatus according to a first embodiment of the invention.

FIG. 1 is a block diagram illustrating the constitution of an on-board multibeam radar apparatus 101 according to a first embodiment of the invention.

In the first embodiment, the invention is applied to a millimeter wave radar of an FMCW type in a multibeam system using a dielectric lens antenna.

As shown in FIG. 1, the multibeam radar apparatus 101 according to the first embodiment includes a dielectric lens 1, M beam elements (antenna elements) 2-1 to 2-M which are plural primary feeds, M directional couplers 3-1 to 3-M, M mixers 4-1 to 4-M, M filters 5-1 to 5-M, an SW (switch) 6, an ADC (A/D (Analog-to-Digital) converter) 7, a signal processing unit 8, a control unit 11, a VCO (Voltage Controlled Oscillator) 12, and a distributor 13.

Here, M represents the number of beam elements 2-1 to 2-M.

The multibeam radar apparatus 101 according to the first embodiment includes M amplifiers 21-1 to 21-M between the M directional couplers 3-1 to 3-M and the M mixers 4-1 to 4-M, includes an amplifier 22 between the SW 6 and the ADC 7, includes an amplifier 23 between the control unit 11 and the VCO 12, includes M amplifiers 24-1 to 24-M between the distributor 13 and the M mixers 4-1 to 4-M, and includes M amplifiers 25-1 to 25-M between the distributor 13 and the M directional couplers 3-1 to 3-M.

Here, in the first embodiment, the dielectric lens 1 and the plurality of beam elements 2-1 to 2-M constitute an antenna unit.

Multibeams capable of simultaneously being transmitted and received are formed by the directional couplers 3-1 to 3-M connected to the beam elements 2-1 to 2-M, respectively <First Constitutional Example of Signal Processing Unit>

Figure 2:
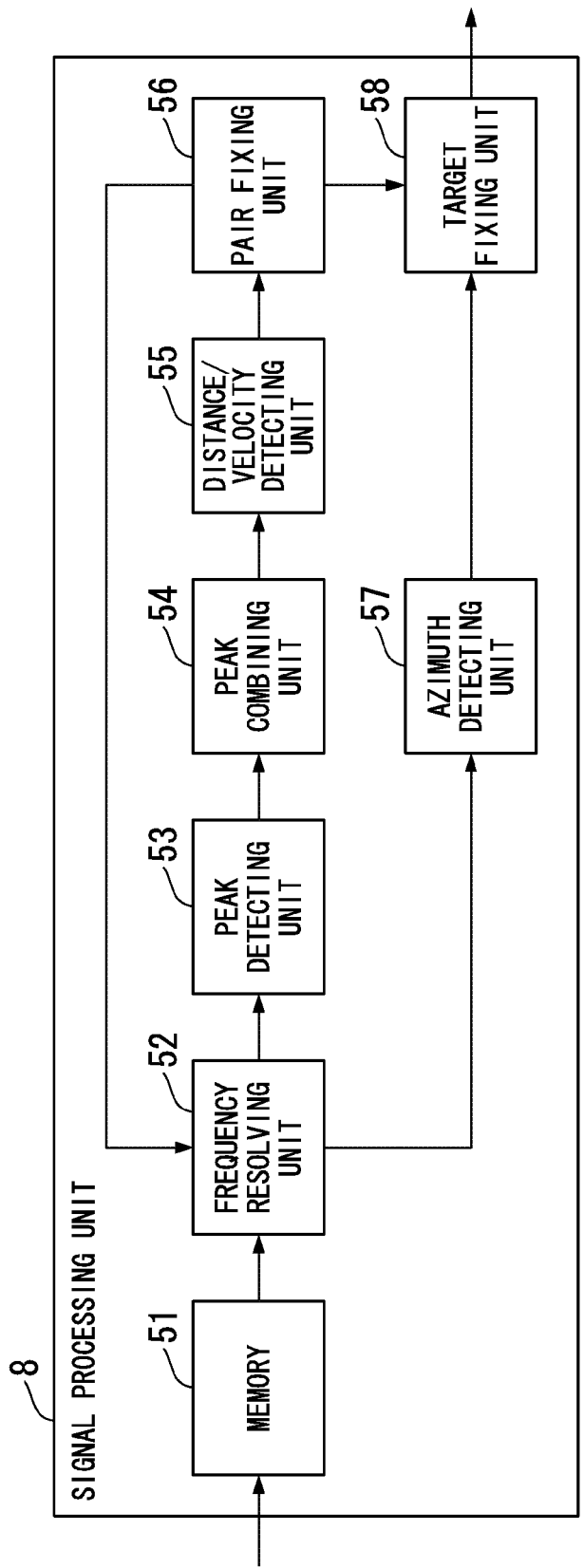
FIG. 2 is a block diagram illustrating a first constitutional example of a signal processing unit of an FMCW type.

FIG. 2 is a block diagram illustrating a first constitutional example of the signal processing unit of an FMCW type (described as a signal processing unit 8).

As shown in FIG. 2, the signal processing unit 8 according to the first constitutional example of the first embodiment includes a memory 51, a frequency resolving unit 52, a peak detecting unit 53, a peak combining unit 54, a distance/velocity detecting unit 55, a pair fixing unit 56, an azimuth detecting unit 57, and a target fixing unit 58.

<Operational Example of Multibeam Radar Apparatus 101 Including Signal Processing Unit 8 According to First Constitutional Example>

An example of the operation performed in the multibeam radar apparatus 101 according to the first embodiment will be described below.

The control unit 11 employs an FMCW system and outputs a signal to the VCO 12 via the amplifier 23.

The VCO 12 outputs a CW signal (FMCW signal) having been subjected to frequency modulation to the distributor 13 based on the signal input from the control unit 11.

The distributor 13 divides the FMCW signal input from the VCO 12 into two signals, outputs one divided signal to the directional couplers 3-1 to 3-M via the amplifiers 25-1 to 25-M, and outputs the other divided signal to the mixers 4-1 to 4-M via the amplifiers 24-1 to 24-M.

The FMCW signal sent from the distributor 13 to the directional couplers 3-1 to 3-M is sent to the beam elements 2-1 to 2-M via the directional couplers 3-1 to 3-M and is transmitted (wirelessly transmitted) from the beam elements 2-1 to 2-M via the dielectric lens 1.

This transmitted wave is returned as a reflected wave when it is reflected by a target. In this case, the reflected wave is received by the beam elements 2-1 to 2-M via the dielectric lens 1 and is input to the directional couplers 3-1 to 3-M.

The received wave (received reflected wave) is input to the mixers 4-1 to 4-M from the directional couplers 3-1 to 3-M via the amplifiers 21-1 to 21-M.

The mixers 4-1 to 4-M mix the received wave (received signal) input from the respective directional couplers 3-1 to 3-M and the FMCW signal (transmitted signal) input from the distributor 13 and outputs a beat signal as the resultant signal to the filters 5-1 to 5-M. Here, beat signals corresponding to the number of elements (M) are generated.

The filters 5-1 to 5-M filter (band-limit) the beat signal input from the mixers 4-1 to 4-M and output the band-limited signal to the SW 6. Here, the beat signals input from the mixers 4-1 to 4-M to the filters 5-1 to 5-M correspond to beat signals of channels (CH) 1 to M corresponding to the beam elements 2-1 to 2-M and generated by the mixers 4-1 to 4-M.

Under the control of the control unit 11, the SW 6 performs a switching operation and outputs the beat signals input from the M filters 5-1 to 5-M to the ADC 7 via the amplifier 22. Specifically, the SW 6 sequentially switches the beat signals of CH1 to CHM corresponding to the beam elements 2-1 to 2-M and passing through the filters 5-1 to 5-M in response to a sampling signal input from the control unit 11 and outputs the beat signals to the ADC 7 via the amplifier 22.

Under the control of the control unit 11, the ADC 7 A/D converts the beat signals input from the SW 6 and outputs the resultant signals to the signal processing unit 8. Specifically, the ADC 7 A/D-converts the beat signals of CH1 to CHM, which are input from the SW 6 in synchronization with the sampling signal, corresponding to the beam elements 2-1 to 2-M in synchronization with the sampling signal to convert analog signals into digital signals and sequentially stores the digital signals in a waveform storage area of the memory (the memory 51 shown in FIG. 2 or 6 in the first embodiment) of the signal processing unit 8.

As a result, the received data (data of the beat signals) for each beam element 2-1 to 2-M (for each CH) is sent to the signal processing unit 8.

The control unit 11 controls the switching operation of the SW 6. The control unit 11 controls the ADC 7. Specifically, the control unit 11 outputs the sampling signal to the SW 6 and the ADC 7.

Here, the control unit 11 is constructed, for example, by a microcomputer or the like and controls the whole multibeam radar apparatus 101 shown in FIG. 1 based on a control program stored in a ROM (Read Only Memory) not shown.

In the first embodiment, the dielectric lens 1, the beam elements 2-1 to 2-M, the directional couplers 3-1 to 3-M, the amplifiers 21-1 to 21-M, the mixers 4-1 to 4-M, the filters 5-1 to 5-M, the SW 6, the amplifier 22, and the ADC 7 constitute a receiver unit.

In the first embodiment, the VCO 12 and the distributor 13 constitute a beat signal generating unit.

The operational example performed by the signal processing unit 8 of the FMCW system according to the first constitutional example of the first embodiment shown in FIG. 2 will be described below.

The memory 51 stores the time-series data (the ascending region and the descending region), which is obtained by performing the A/D conversion on the received signal (beat signal) by the use of the ADC 7, in the waveform storage area in a manner associated with the beam elements 2-1 to 2-M. For example, when 256 pieces of data are sampled from each of the ascending region and the descending region, data pieces of 2×256×number of elements are stored in the waveform storage area.

In this manner, the beat signals corresponding to CH of the beam elements 2-1 to 2-M are stored in the memory 51.

The frequency resolving unit 52 transforms the beat signals corresponding to the channels CH1 to CHM (the beam elements 2-1 to 2-M) into frequency components with a predetermined resolution, for example, through the use of the Fourier transformation and thus outputs frequency points indicating the beat frequencies and complex data of the beat frequencies. For example, when each of the ascending region and the descending region of each beam element 2-1 to 2-M has 256 sampled data pieces, the data pieces are transformed to the beat frequencies as complex frequency-domain data for each beam element 2-1 to 2-M, and 128 pieces of complex data (data pieces of 2×128×number of elements) are generated for each of the ascending region and the descending region. The beat frequencies appear at the frequency points.

In this manner, the frequency resolving unit 52 transforms the beat signals to a range of beat frequencies through the use of the Fourier transformation for each CH of the beam elements 2-1 to 2-M.

Regarding the peak values of the intensity in the ascending region and the descending region of a triangular wave at the frequency-transformed beat frequencies, the peak detecting unit 53 detects the beat frequencies having a peak value greater than a predetermined value (peak-detecting threshold value) from the peaks of the signal intensity (or amplitude) using the complex data. Accordingly, the presence of a target for each beat frequency is detected and the target frequency is selected.

In this manner, the peak detecting unit 53 can detect the peak value of each spectrum as the beat frequency, that is, the presence of a target depending on the distance, by converting the complex data for each beam element 2-1 to 2-M into a frequency spectrum.

The peak combining unit 54 combines all the beat frequencies of the ascending region and the descending region and the peak values thereof in a matrix shape based on the beat frequencies and the peak values thereof output from the peak detecting unit 53 for each beam element, thus combines the beat frequencies of the ascending region and the descending region, and sequentially outputs the combinations to the distance/velocity detecting unit 55.

In the first embodiment, since such combination is performed for each CH of the beam elements 2-1 to 2-M, the presence of a target can be detected for each beam direction.

The distance/velocity detecting unit 55 calculates the distance r from the target based on the values obtained by adding the beat frequencies of the combinations of the ascending region and the descending region sequentially input thereto.

The distance/velocity detecting unit 55 calculates the relative velocity v based on the difference between the beat frequencies of the combinations of the ascending region and the descending region sequentially input thereto.

In the first embodiment, the calculations of the distance r and the relative velocity v is performed for each CH of the beam elements 2-1 to 2-M.

The pair fixing unit 56 creates a first pair table based on the input distance r, the input relative velocity v, and the input peak levels $p_u$ and $p_d$ of the ascending region and the descending region for each CH, determines a suitable combination of the peaks of the ascending region and the descending region for each target, fixes the pair of peaks of the ascending region and the descending region using a second pair table, and outputs a target group number indicating the fixed distance r and the fixed relative velocity v to the target fixing unit 58.

The first pair table is a table showing a matrix of the beat frequencies of the ascending region and the descending region and intersections of the matrix, that is, the distance and the relative velocity in the combinations of the beat frequencies of the ascending region and the descending region, in the peak combining unit 54.

The second pair table is a table showing the distance, the relative velocity, and the frequency point for each target group. For example, in the second pair table, the distance, the relative velocity, and the frequency point (the ascending region and/or the descending region) are stored in manner associated with the target group number.

The first pair table and the second pair table are stored, for example, in the inner storage of the pair fixing unit 56.

The pair fixing unit 56 may employ a technique of selecting the combination of the target groups preferentially using the values predicted in the present detection cycle rather than the distances r and the relative velocities v from and to the targets, which are finally fixed, for example, in the preceding detection cycle.

The pair fixing unit 56 sends the frequencies, of which a pair is fixed, to the frequency resolving unit 52 for each CH.

The frequency resolving unit 52 having received the frequencies outputs specific frequency point data (complex data) of the beam elements 2-1 to 2-M (CH) used to estimate the azimuth (to detect the azimuth) to the azimuth detecting unit 57. That is, when a pair is present at a specific frequency point of any CH, the specific frequency point data is used as the complex data used to detect the azimuth by forming a set along with data at the same frequency point of another CH.

Here, one of the ascending and the descending may be used as the complex data, or both the ascending and the descending may be used.

The azimuth detecting unit 57 performs a spectrum estimating process using a high-resolution algorithm such as the MUSIC method or the linear prediction method. The azimuth detecting unit 57 detects the azimuth of a corresponding target based on the result of the spectrum estimation process and outputs the detected azimuth to the target fixing unit 58.

At this time, in the first embodiment, the azimuth detecting unit 57 applies the Fourier transformation to the complex data (beam element data) based on the a plurality of beam elements 2-1 to 2-M constituting an antenna to create complex data (virtual array data) based on a plurality of virtual array elements constituting a virtual array antenna and performs the spectrum estimating process using a high-resolution algorithm such as the MUSIC method or the linear prediction method.

In this manner, the azimuth detecting unit 57 performs the process of estimating the azimuth of a target.

The target fixing unit 58 fixes a target based on the distance r, the relative velocity v, and the frequency point output from the pair fixing unit 56 and the azimuth of a target detected by the azimuth detecting unit 57.

In this manner, the azimuth is determined along with the distance r from the target and the relative velocity v, and the target is fixed.

The principle of detecting the distance between the multi-beam radar apparatus 101 and a target, the relative velocity therebetween, and the angle (azimuth) thereof, which is used in the signal processing unit 8 according to the first embodiment, will be described in brief below. Here, the FMCW system is assumed.

Figure 3:
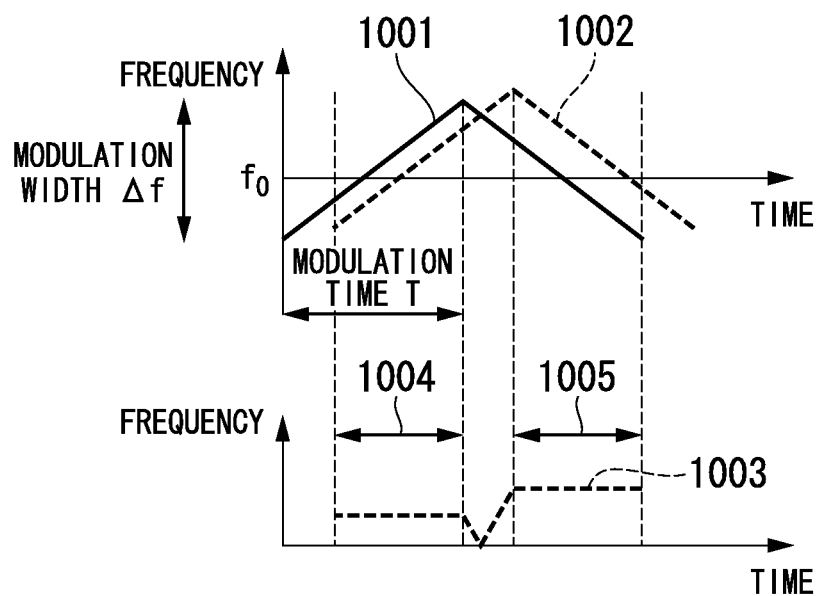
FIG. 3 is a diagram illustrating the relationship between an FMCW signal and a beat signal.
Figure 4:
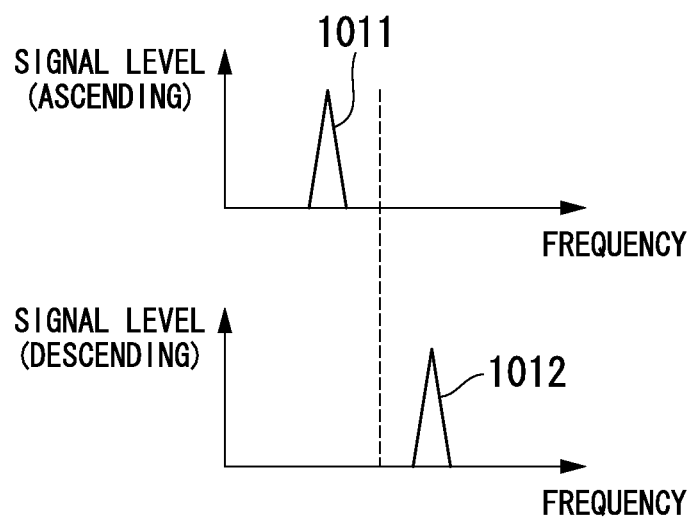
FIG. 4 is a diagram illustrating an example of the level of a received signal from a target in an ascending region and a descending region.

FIGS. 3 and 4 are graphs illustrating a state where a transmitted signal 1001 is reflected by a target and a received signal 1002 is input. In the examples of FIGS. 3 and 4, the number of targets is 1.

FIG. 3 is a diagram illustrating the relationship between an FMCW signal and a beat signal. Specifically, the relationship between the transmitted signal and the time, the relationship between the received signal and the time, and the relationship between the beat signal and the time are shown. In FIG. 3, the horizontal axis represents the time and the vertical axis represents the frequency.

FIG. 4 is a diagram illustrating an example of the level of the received signal from a target in the ascending (ascending region) and the descending (descending region). Specifically, the relationship between the received signal and the frequency in the ascending region and the descending region is shown. In FIG. 4, the horizontal axis represents the frequency and the vertical axis represents the signal level (intensity).

FIG. 3 shows the transmitted signal 1001 obtained by frequency-modulating a triangular wave signal generated by the control unit 11 through the use of the VCO 12, the received signal 1002 received by causing a target to reflect the transmitted signal 1001, and the beat signal 1003 thereof.

In addition, FIG. 3 shows the ascending region 1004 and the descending region 1005. FIG. 3 also shows the central frequency $f_0$, the modulation width $\Delta f$, and the modulation time T.

As can be seen from FIG. 3, the received signal 1002 which is a reflected wave from the target is received with a delay in a right-hand direction (time delay direction) with respect to the transmitted signal 1001 in proportion to the distance from the target. The received signal 1002 is shifted in the vertical direction (frequency direction) with respect to the transmitted signal 1001 in proportion to the relative velocity to the target.

When the beat signal 1003 acquired in FIG. 3 is frequency-transformed (through the use of the Fourier transformation, a DTC, a Hadamard transform, a wavelet transform, or the like), one peak value is generated in each of the ascending region and the descending region in the case of a single target, as shown in FIG. 4.

Specifically, the ascending received signal 1011 has a peak value at the frequency $f_u$. The descending received signal 1012 has a peak value at the frequency $f_d$.

The frequency resolving unit 52 performs a frequency resolution on sampled data of the beat signals stored in the memory 51 in each of the ascending region (ascending) and the descending region (descending) of a triangular wave at discrete times and performs a frequency transformation, for example, through the use of the Fourier transformation. That is, the frequency resolving unit 52 decomposes the beat signals into beat frequencies having a predetermined frequency bandwidth and calculates complex data based on the beat signals decomposed for each beat frequency.

As a result, as shown in FIG. 4, a graph of signal levels for the decomposed beat frequencies in the ascending region and the descending region is obtained.

The peak detecting unit 53 detects the peak value from the signal level for each beat frequency shown in FIG. 4 to detect the presence of a target and outputs the beat frequencies $f_u$ and $f_d$ (both the ascending region and the descending region) of the peak values as target frequencies.

The distance/velocity detecting unit 55 calculates the distance r through the use of Equation (1) based on the target frequency $f_u$ of the ascending region and the target frequency $f_d$ of the descending region which are input from the peak combining unit 54.

$$r = \{C \times T/(2 \times \Delta f)\} \times \{(f_u + f_d)/2\} \quad (1)$$

The distance/velocity detecting unit 55 calculates the relative velocity v through the use of Equation (2) based on the target frequency $f_u$ of the ascending region and the target frequency $f_d$ of the descending region which are input from the peak combining unit 54.

$$v = \{C/(2 \times f_0)\} \times \{(f_u - f_d)/2\} \quad (2)$$

In Equations (1) and (2) of calculating the distance r and the relative velocity v, C represents the light speed, $\Delta f$ represents the frequency modulation width of a triangular wave, $f_0$ represents the central frequency of the triangular wave, T represents the modulation time (ascending region/descending region), $f_u$ represents the target frequency of the ascending region, and $f_d$ represents the target frequency of the descending region.

Figure 5:
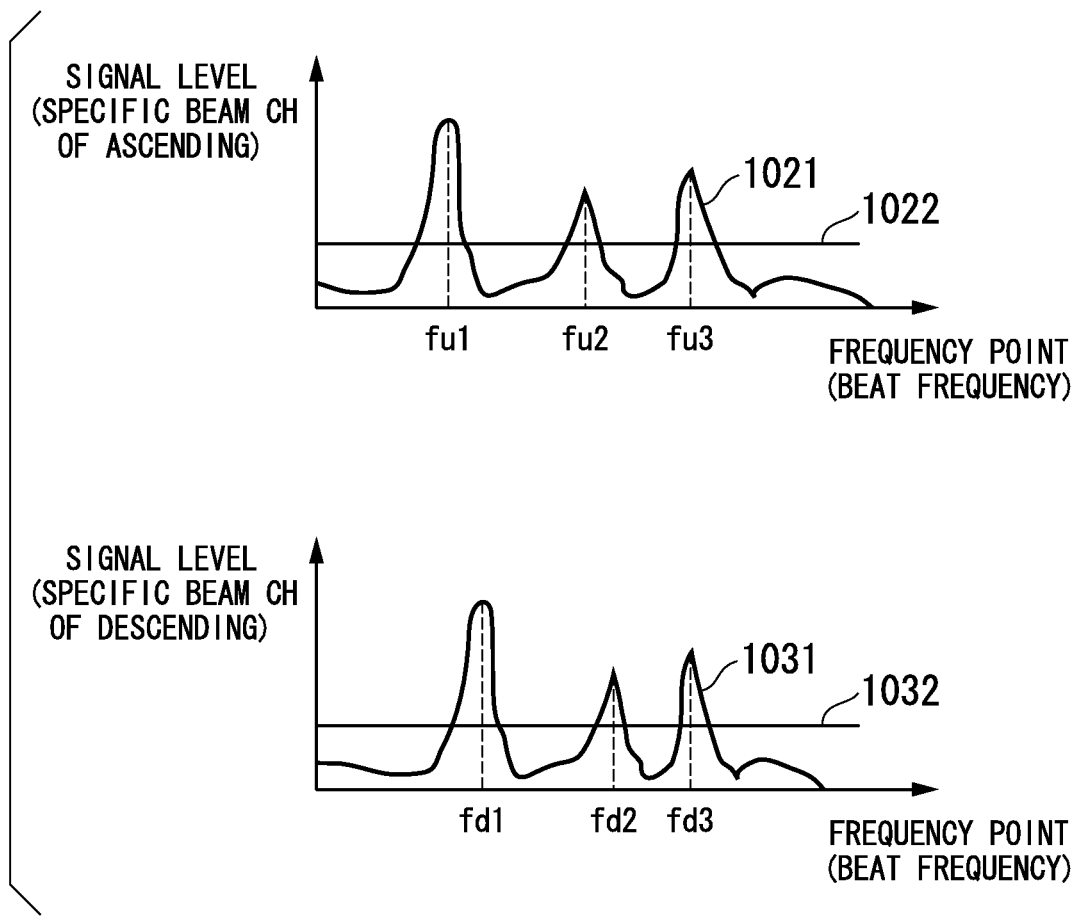
FIG. 5 is a graph illustrating the frequency resolution result of a beat signal and shows beat frequencies (horizontal axis) and peak values (vertical axis) thereof.

FIG. 5 shows the result of the frequency resolution on the beat signals and is a graph illustrating the beat frequencies and the peak values thereof. In the graph shown in FIG. 5, the horizontal axis represents the frequency point of a beat frequency and the vertical axis represents the signal level (intensity).

Specifically, in a beat signal 1021 of a specific beam CH of the ascending region, three beat frequencies $f_u1$, $f_u2$, and $f_u3$ having a peak value greater than a predetermined value (peak-detecting threshold value) 1022 appear.

In a beat signal 1031 of a specific beam CH of the descending region, three beat frequencies $f_d1$, $f_d2$, and $f_d3$ having a peak value greater than a predetermined value (peak-detecting threshold value) 1032 appear.

In this manner, three targets are present in the distance direction in this example.

The peak combining unit 54 combines all the beat frequencies of the ascending region and the descending region and the peak values thereof in a matrix shape based on the beat frequencies and the peak values thereof output from the peak detecting unit 53 and shown in FIG. 5, combines all the beat frequencies of the ascending region and the descending region, and sequentially outputs the combinations to the distance detecting unit 25 and the velocity detecting unit 26.

<Second Constitutional Example and Operational Example of Signal Processing Unit>

Figure 6:
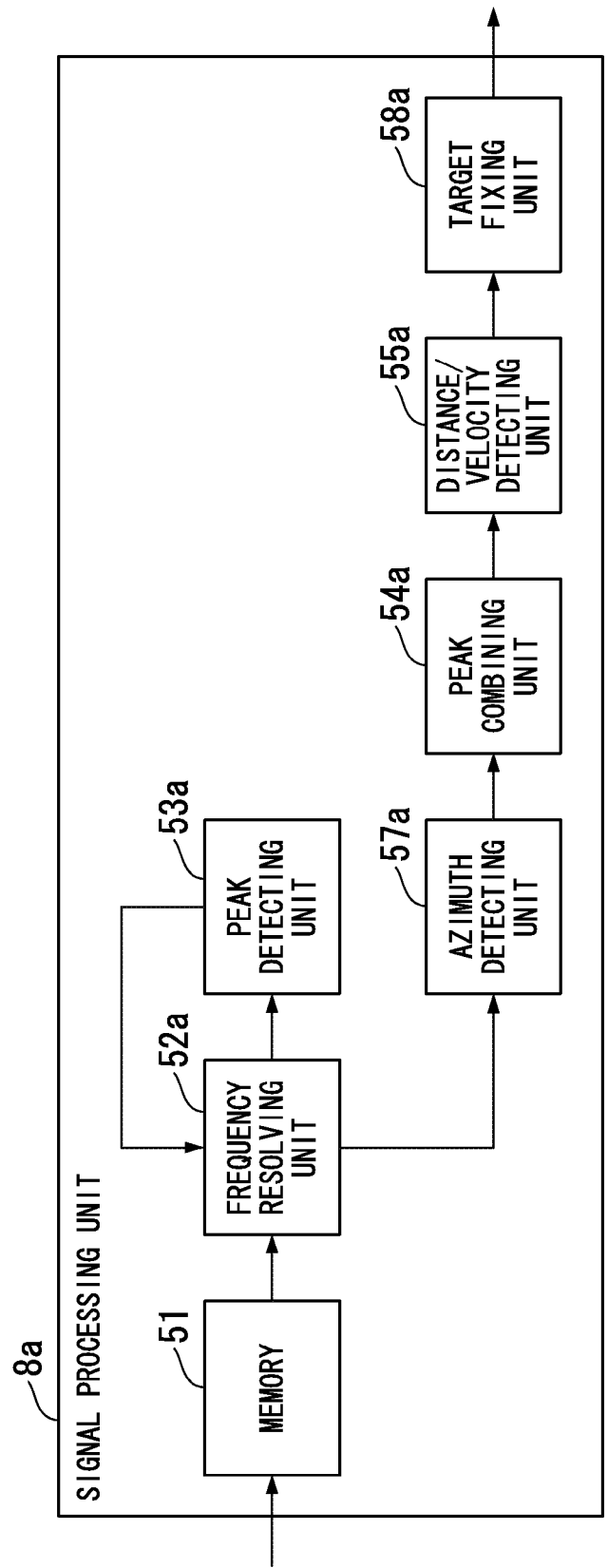
FIG. 6 is a block diagram illustrating a second constitutional example of the signal processing unit of the FMCW type.

FIG. 6 is a block diagram illustrating a second constitutional example of the signal processing unit of the FMCW type (described as a signal processing unit 8a).

As shown in FIG. 6, the signal processing unit 8a according to the second constitutional example of the first embodiment includes a memory 51, a frequency resolving unit 52a, a peak detecting unit 53a, an azimuth combining unit 57a, a peak combining unit 54a, a distance/velocity detecting unit 55a, and a target fixing unit 58a.

Here, the memory 51 is the same as shown in FIG. 2 and is denoted by the same reference numeral as shown in FIG. 2.

In the constitution shown in FIG. 6, a pair is fixed after an azimuth is detected both in the ascending region (rising region) and descending region (falling region) of a triangular wave in the FMCW system.

The signal processing unit 8a shown in FIG. 6 estimates an azimuth through the use of a high-resolution algorithm in the same way as shown in FIG. 2. Differences from FIG. 2 will be described below.

The frequency resolving unit 52a converts the beat signals of the ascending region and the descending region into complex data for each antenna and outputs the frequency points indicating the beat frequencies and the complex data to the peak detecting unit 53a.

The frequency resolving unit 52a outputs the complex data of the ascending region and the descending region to the azimuth detecting unit 57a. The complex data is a target group (beat frequencies having a peak in the ascending region and the descending region) of each of the ascending region and the descending region.

The peak detecting unit 53a detects the peak values of the ascending region and the descending region and the frequency points at which the peak values are present, and outputs the frequency points to the frequency resolving unit 52a.

The azimuth detecting unit 57a performs a spectrum estimating process through the use of a high-resolution algorithm such as the MUSIC method or the linear prediction method. The azimuth detecting unit 57a detects the azimuth of a corresponding target based on the result of the spectrum estimating process.

At this time, in the first embodiment, the azimuth detecting unit 57a applies Fourier transformation to the complex data (beam element data) based on the plurality of beam elements 2-1 to 2-M constituting an antenna to create complex data (virtual array data) based on a plurality of virtual array elements constituting a virtual array antenna and performs the spectrum estimating process using a high-resolution algorithm such as the MUSIC method or the linear prediction method.

The azimuth detecting unit 57a detects an angle θ for each of the ascending region and the descending region and outputs the detected angles as an azimuth table to the peak combining unit 54a.

Here, the azimuth table is a table used to combine the peaks of the ascending, region and the descending region.

Specifically, in the azimuth table of the ascending region, angle 1, angle 2, ..., and the frequency points f are correlated with the target groups. For example, target group 1 is correlated with $t_{1\_}ang_1$ of angle 1, $t_{1\_}ang_2$ of angle 2, and the frequency point $f_1$. Target group 2 is correlated with $t_{2\_}ang_1$ of angle 1, $t_{2\_}ang_2$ of angle 2, and the frequency point $f_2$. The same is true of the subsequent target groups.

In the azimuth table of the descending region, angle 1, angle 2, . . . , and the frequency points f are correlated with the target groups. For example, target group 1 is correlated with $t_{1\_}ang_1$ of angle 1, $t_{1\_}ang_2$ of angle 2, and the frequency point $f_1$. Target group 2 is correlated with $t_{2\_}ang_1$ of angle 1, $t_{2\_}ang_2$ of angle 2, and the frequency point $f_2$. The same is true of the subsequent target groups.

The peak combining unit 54a generates a combination having the same angle using the information of the azimuth table output from the azimuth detecting unit 57a and outputs the combinations of beat frequencies of the ascending region and the descending region to the distance/velocity detecting unit 55a.

The distance/velocity detecting unit 55a calculates the distance r from the target based on the values obtained by adding the beat frequencies of the combinations of the ascending region and the descending region sequentially input thereto through the use of Equation (1).

The distance/velocity detecting unit 55a calculates the relative velocity v based on the difference between the beat frequencies of the combinations of the ascending region and the descending region sequentially input thereto through the use of Equation (2).

Here, the distance/velocity detecting unit 55a calculates the values of the distance and the relative velocity based on the combinations of beat frequencies of the ascending region and the descending region.

The target fixing unit 58a determines pairs of peaks of the ascending region and the descending region and fixes a target.

In this manner, in the constitution shown in FIG. 6, unlike the constitution shown in FIG. 2, the azimuth detecting unit 57a first performs the azimuth estimation on the ascending region and the descending region and pairs are then fixed as a result.

<Detailed Operation of Azimuth Detecting Unit>

The detailed operation performed by the azimuth detecting unit 57 shown in FIG. 2 will be described below. The same is true of the detailed operation performed by the azimuth detecting unit 57a shown in FIG. 6.

The principle of the invention, in the case of a multibeam system, focuses on a Fourier transformation relationship between the receiving pattern in the primary feeds and the distribution function of an antenna aperture (the distribution function of a wave source, for example, a phase distribution function).

Figure 7:
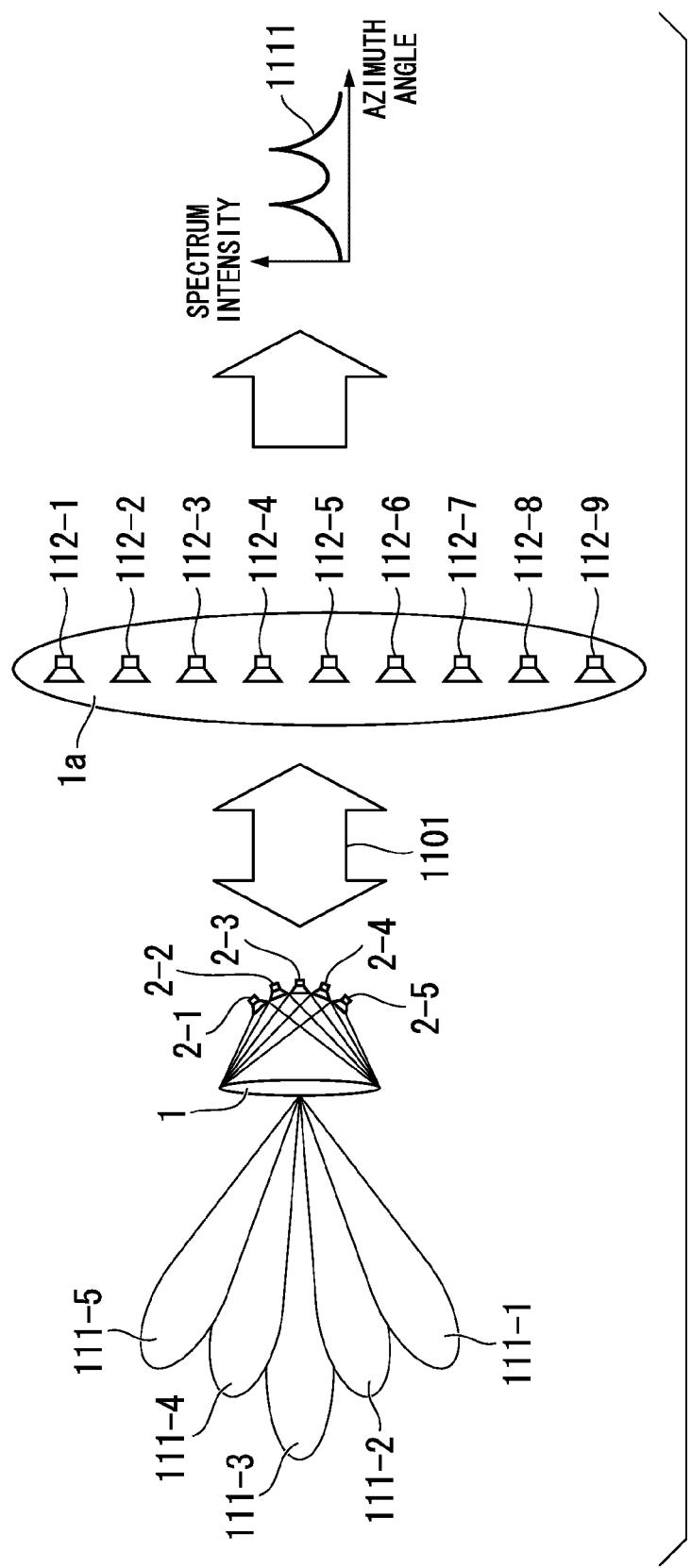
FIG. 7 is a diagram schematically illustrating the flow of processes performed by an azimuth detecting unit.

FIG. 7 is a diagram schematically illustrating the flow of processes performed by the azimuth detecting unit 57.

Data transmitted and received via the plurality of beam elements 2-1 to 2-M (CH) can be transformed into data transmitted and received via a plurality of virtual array elements through the use of the Fourier transformation 1101.

FIG. 7 shows a case where the number of beam elements 2-1 to 2-M (number of elements) is 5 (M=5) as an example of the first feeds.

Beams 111-1 to 111-5 are transmitted and received via the dielectric lens 1 through the five beam elements 2-1 to 2-5.

FIG. 7 shows a case where the number of virtual array elements (virtual array elements) 112-1 to 112-9 (number of elements) is 9 as an example of the virtual array elements.

In this case, all the virtual array elements 112-1 to 112-9 are arranged to be included in the lens aperture length (the same aperture length, as the dielectric lens 1) of a virtual dielectric lens 1a equivalent to the dielectric lens 1.

In this case, a plurality of virtual array elements 112-1 to 112-9 is arranged at constant intervals.

Here, the inventor induced that when the elements are arranged within the lens aperture length at the time of conversion into data to be transmitted and received through the virtual array elements as in this case, it is possible to form the virtual array elements with any number of elements and any element interval.

By using the data to be transmitted and received through the virtual array elements 112-1 to 112-M, it is possible to perform the processes of a high-resolution algorithm, such as the MUSIC method or the linear prediction method, or to form a beam with a changed number of elements and element interval.

In a specific example, a graph 1111 indicating the relationship between an azimuth angle (angle) and a spectrum intensity is obtained through the use of a high-resolution algorithm, and based on this, the angles of multiple targets can be measured with a high resolution.

Therefore, when estimating an azimuth using a high-resolution algorithm or a beam forming based on the calculated virtual array element data, the azimuth detecting unit 57 according to the first embodiment can flexibly set input data depending on the processing situation of the high-resolution algorithm or the beam forming pattern.

Figure 8:
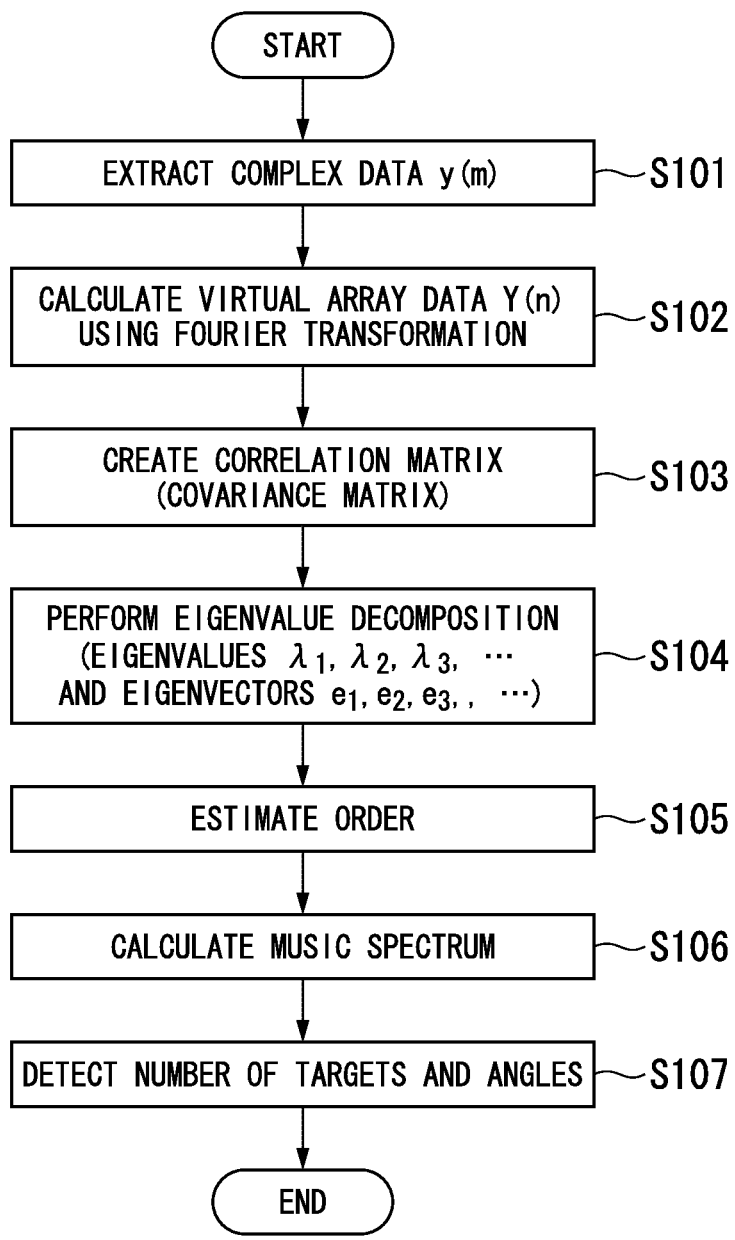
FIG. 8 is a flowchart illustrating an example of the flow of processes performed by the azimuth detecting unit according to the first embodiment of the invention.

FIG. 8 is a flowchart illustrating the flow of processes performed by the azimuth detecting unit 57. In this example, the MUSIC method is used as a high-resolution algorithm.

The flow of processes in this flowchart is repeatedly performed for each beat frequency point at which a target is detected through a peak detection.

First, the azimuth detecting unit 57 reads the complex data y(m) of the CH of a plurality of beam elements 2-1 to 2-M at one of the beat frequencies which are extracted by the frequency resolving unit 52 and at which a target is present (step S101).

The azimuth detecting unit 57 transforms the read complex data y(m) of the CH of the plurality of beam elements 2-1 to 2-M through the use of the Fourier transformation equation expressed by Equation (3) to calculate virtual array data Y(n) (step S102).

$$Y(n) = \frac{1}{2\pi} \sum_{m=1}^{M} y(m) e^{-ju(m)v(n)} \tag{3}$$

Here, m=1 to M represents the number of a beam element, n represents the number of a virtual array element, y(m) represents m-th beam element data, Y(n) represents n-th virtual array data $u(m)=2\pi \sin \theta_m$, $\theta_m$ represents the direction the m-th multi beam, and v(n) represents the position of the n-th virtual array element.

For example, the position v(n) of the m-th virtual array element is expressed by $v(n)=d \times (n-1)$ using a predetermined interval d.

As shown in Equation (3), the virtual array data Y(n) in which the number of elements and the element interval are arbitrarily set can be obtained from the beam element data y(m) by the input of the actual multibeam direction $\theta_m$ and the set position v(n) of the virtual array element.

In the processes of steps S103 to S107, the virtual array data Y(n) calculated through the process of step S102 is processed using the MUSIC method.

Figure 9:
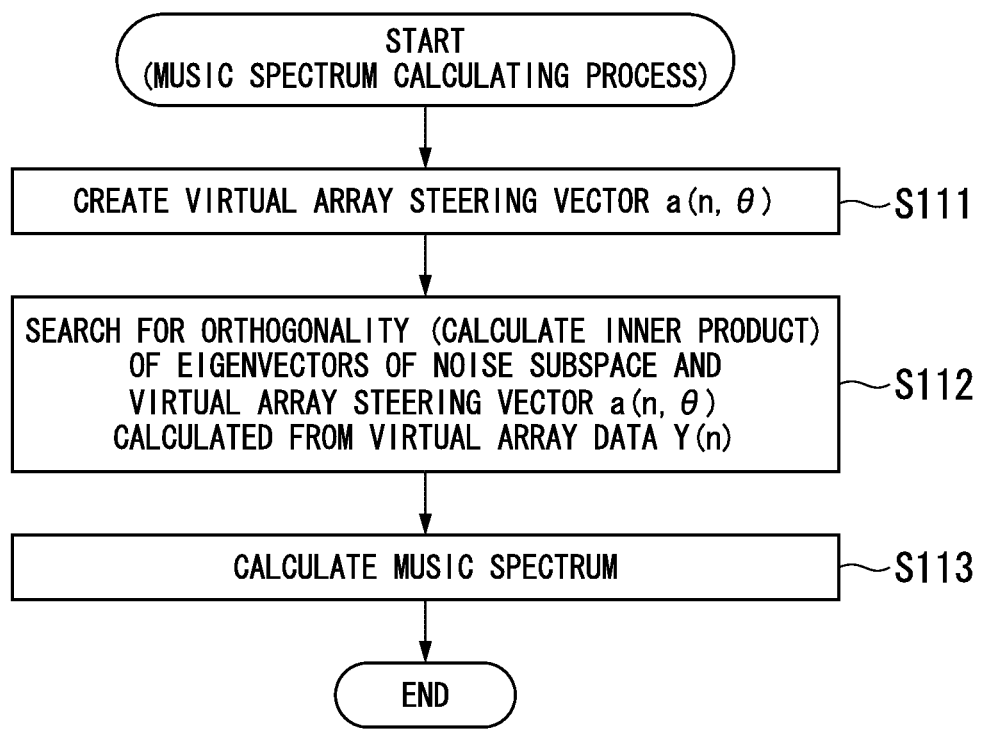
FIG. 9 is a flowchart illustrating an example of the flow of a MUSIC spectrum calculating process performed by the azimuth detecting unit according to the first embodiment of the invention.

The MUSIC method is generally used and can employ various known techniques (for example, refer to Patent Document 1 for the details of the processes of steps S103 to S107). As shown in FIG. 9, a characterized process is performed in the first embodiment, which is different from the related art.

Schematically, the azimuth detecting unit 57 creates a correlation matrix (covariance matrix) (step S103).

Then, the azimuth detecting unit 57 performs an eigenvalue decomposition process to calculate eigenvalues $\lambda_1$, $\lambda_2$, $\lambda_3$, ... and eigenvectors $e_1$, $e_2$, $e_3$, ... (step S104).

The azimuth detecting unit 57 estimates the order (step S105).

The azimuth detecting unit 57 calculates a MUSIC spectrum (step S106).

The azimuth detecting unit 57 detects the number of targets and the angles (step S107).

FIG. 9 is a flowchart illustrating an example of the flow of a MUSIC spectrum calculating process (the process of step S106 shown in FIG. 8) performed by the azimuth detecting unit 57.

In the MUSIC spectrum calculating process, the azimuth detecting unit 57 first creates a steering vector $a(n, \theta)$ of a virtual array (step S111). The steering vector $a(n, \theta)$ is expressed by Equation (4).

$$\alpha(n, \theta) = \frac{1}{2\pi} \sum_{m=1}^{M} y(m, \theta) e^{-ju(m)v(n)} \quad (4)$$

Here, m=1 to M represents the number of a beam element, n represents the number of a virtual array element, $\theta$ represents a searching incident angle, $y(m, \theta)$ represents m-th beam element data at the searching incident angle $\theta$, $a(n, \theta)$ represents the n-th steering vector at the searching incident angle $\theta$, $u(m)=2\pi \sin \theta_m$, $\theta_m$ represents the direction the m-th multibeam, and $v(n)$ represents the position of the n-th virtual array element.

Then, the azimuth detecting unit 57 searches for the orthogonality of the eigenvector in a noise subspace calculated from the virtual array data Y(n) and the steering vector $a(n, \theta)$ of a virtual array (step S112). In this process, the inner product is used. Specifically, the calculation of the MUSIC method expressed by Equation (5) is performed (for example, refer to "Adaptive Antenna Technique", written by Nobuyoshi Kikuma and published by Ohmsha Ltd., 2003 (Non-patent Document 1) for the general MUSIC method).

$$P_{MUSIC}(\theta) = \frac{a^H(\theta)a(\theta)}{|a(\theta) \cdot e_{L+1}^H|^2 + |a(\theta) \cdot e_{L+2}^H|^2 + \ldots + |a(\theta) \cdot e_K^H|^2} \quad (5)$$
$$= \frac{a^H(\theta)a(\theta)}{a^H(\theta)E_N E_N^H a(\theta)}$$

Here, $\theta$ represents a searching incident angle, $P_{MUSIC}(\theta)$ represents a MUSIC spectrum, $a(\theta)$ represents a mode vector, $e_i$ represents the i-th eigenvector (where i=L+1 to K), L+1 to K represent the number of a noise subspace, K represents the number of elements, L represents the number of arrival waves (plane waves), $EN=[e_{L+1}, \ldots, e_K]$, and H on the right-handed shoulder represents a complex conjugate transpose (Hermitian transpose).

In this manner, the azimuth detecting unit 57 acquires the MUSIC spectrum $P_{MUSIC}(\theta)$ (step S113).

Specifically, as shown in FIG. 7, the graph 1111 illustrating the relationship between the azimuth angle (angle) and the spectrum intensity can be acquired through the use of a high-resolution algorithm and the angles of multiple targets can be measured with a high resolution on the basis thereof.

In the first embodiment, as expressed by Equation (4), the steering vector $a(n, \theta)$ is created (calculated) by the input of the actual multibeam direction $\theta_m$ and the set position $v(n)$ of the virtual array element, similarly to the creation (calculation) of the virtual array data Y(n) expressed by Equation (3). The first embodiment is characterized by this point.

Accordingly, in the first embodiment, the steering vector $a(n, \theta)$ capable of searching for the orthogonality to the virtual array data Y(n) can be created. The azimuth estimation of the virtual array data Y(n) cannot be performed using the steering vector created from general linear array data.

<Example of Arrangement of Virtual Array Elements>

An example of the arrangement of virtual array elements will be described below.

For example, it is assumed that the number of virtual array elements is N. The plurality of virtual array elements 1 to N is arranged in an array shape at intervals d. An arrival wave (incident wave, that is, the reflected wave from a target in response to the transmitted wave transmitted from the transmitting antenna) from a target incident from the direction of angle $\theta$ about an axis perpendicular to the plane on which the plurality of virtual array elements 1 to N is input to the receiving antenna including a plurality of virtual array elements 1 to N.

At this time, the arrival wave is received at the same angle by the plurality of virtual array elements 1 to N.

A phase difference "d×sin $\theta$" calculated using the same angle, for example, the angle $\theta$, and the interval d between the antennas appears between the adjacent virtual array elements 1 to N.

The angle $\theta$ can be detected, for example, through the use of a signal process such as a beam forming process or a high-resolution algorithm of additionally Fourier-transforming the values, which are subjected to the frequency resolution in the time direction for each of the virtual array elements 1 to N, in the antenna direction using the phase difference.

Here, a phase difference based on the angle $\theta$ exists in the complex data pieces for the virtual array elements 1 to N. The absolute values (receiving intensities or amplitudes) of the complex data pieces in the complex plane are equivalent to each other.

<Example of Formation of Multibeam>

Figure 10:
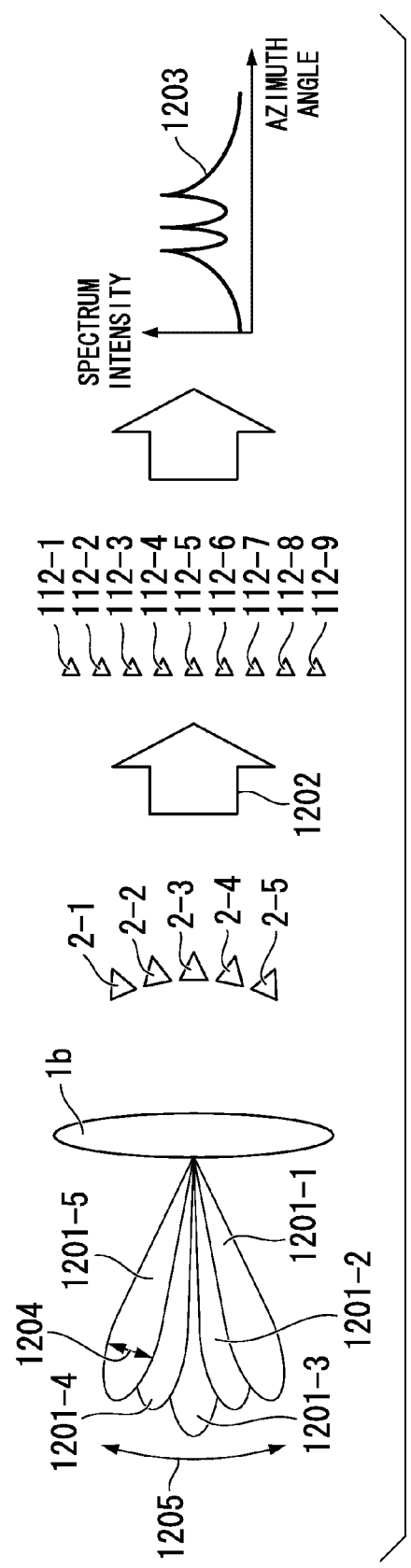
FIG. 10 is a diagram illustrating an example where a multibeam for detecting a distant target is formed.

FIG. 10 is a diagram illustrating an example where a multi-beam for detecting a distant target is formed. In this example, it is assumed that the number of beam elements (primary feeds) 2-1 to 2-M is 5 (M=5).

In this example, the shape of the dielectric lens 1b (corresponding to the dielectric lens 1 shown in FIG. 1) and the positions of five beam elements 2-1 to 2-5 are determined to realize a narrow FOV (Field Of View) 1205. Accordingly, beams 1201-1 to 1201-5 having a small beam width 1204 are formed.

By forming this narrow beam, for example, it is possible to detect a target located at a distant position.

The azimuth of the target is estimated by transforming the beam element data y(m) acquired through the five beam elements 2-1 to 2-5 to the virtual array data Y(n) through the use of the Fourier transformation 1202 or transforming the beam element data $y(m, \theta)$ at the searching incident angle to the steering vector $a(n, \theta)$ through the use of the Fourier transformation.

Here, virtual array elements having, for example, any number of elements and any element interval can be used.

In this example, it is assumed that nine virtual array elements 112-1 to 112-9 are linearly arranged at a constant interval and it is also assumed that both ends of the virtual array elements 112-1 to 112-9 are arranged to be included in the aperture length of the dielectric lens 1b.

In the azimuth estimation, it is possible to detect the azimuth (angle) of a target at a small angle with a high resolution by using the virtual array data.

Specifically, the graph 1203 illustrating the relationship between the azimuth angle (angle) and the spectrum intensity can be acquired through the use of a high-resolution algorithm and the angles of multiple targets can be measured with a high resolution on the basis thereof.

Accordingly, it is possible to detect a target with a small RCS such as a motorcycle.

Figure 11:
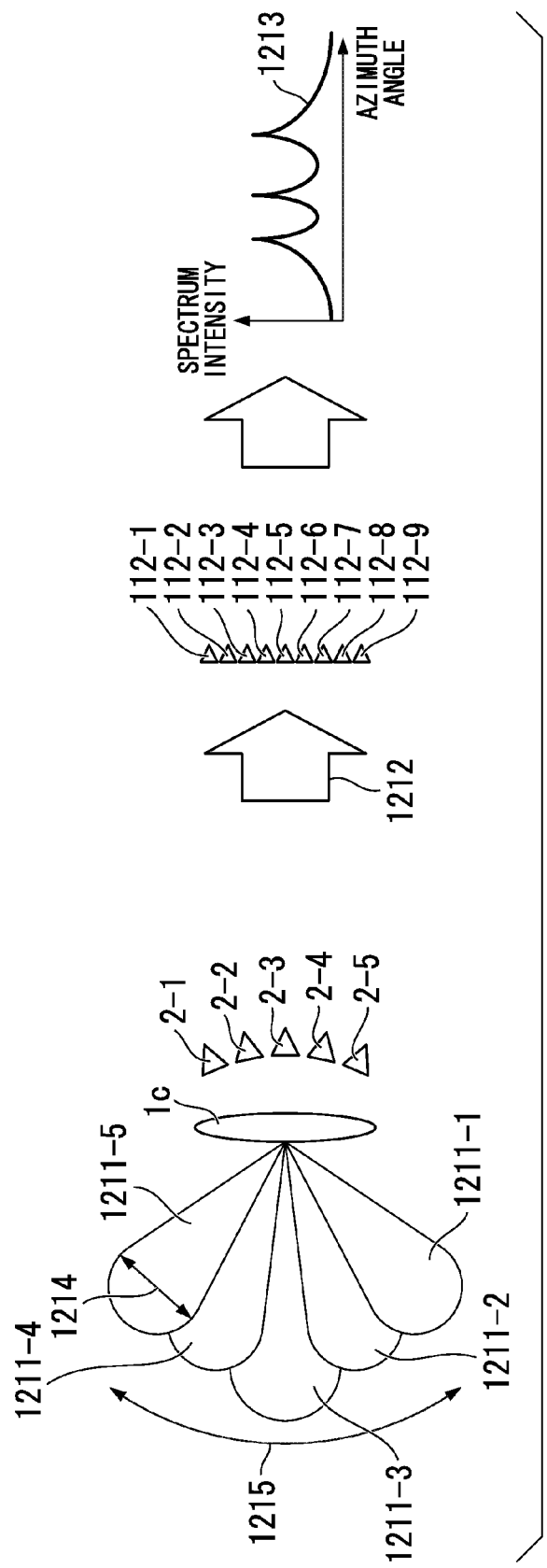
FIG. 11 is a diagram illustrating an example where a multibeam for detecting a near target is formed.

FIG. 11 is a diagram illustrating an example where a multibeam for detecting a near target is formed. In this example, it is assumed that the number of beam elements (primary feeds) 2-1 to 2-M is 5 (M=5).

In this example, the shape of the dielectric lens 1c (corresponding to the dielectric lens 1 shown in FIG. 1) and the positions of five beam elements 2-1 to 2-5 are determined to realize a wide FOV (Field Of View) 1215. Accordingly, beams 1211-1 to 1211-5 having a large beam width 1214 are formed.

By forming this wide beam, for example, it is possible to detect a target located at a near position.

The azimuth of the target is estimated by transforming the beam element data y(m) acquired through the five beam elements 2-1 to 2-5 to the virtual array data Y(n) through the use of the Fourier transformation 1212 or transforming the beam element data y(m, θ) at the searching incident angle to the steering vector a(n, θ) through the use of the Fourier transformation.

Here, virtual array elements having, for example, any number of elements and any element interval can be used.

In this example, it is assumed that nine virtual array elements 112-1 to 112-9 are linearly arranged at a constant interval and it is also assumed that both ends of the virtual array elements 112-1 to 112-9 are arranged to be included in the aperture length of the dielectric lens 1c.

In the azimuth estimation, it is possible to detect the azimuth (angle) of a target at a large angle with a high resolution by using the virtual array data.

Specifically, the graph 1213 illustrating the relationship between the azimuth angle (angle) and the spectrum intensity can be acquired through the use of a high-resolution algorithm and the angles of multiple targets can be measured with a high resolution on the basis thereof.

Accordingly, it is possible to detect a target with a small RCS such as a walker or a bicycle.

As shown in FIGS. 10 and 11, in the first embodiment, the shape of the dielectric lens 1 or the positions of the primary feeds (beam elements 2-1 to 2-M) are changed so as to realize an application for a small angle (for example, for detecting a distant target, ±10 deg) shown in FIG. 10 and to realize an application for a large angle (for example, for detecting a near target, ±40 deg) shown in FIG. 11.

In the examples shown in FIGS. 10 and 11, the shapes (for example, including the sizes) of the dielectric lenses 1b and 1c or the arrangements of the plurality of beam elements 2-1 to 2-5 are changed. The beam elements depart from the focal lengths of the dielectric lenses 1b and 1c. The beam width is changed depending on the arrangement of the dielectric lenses 1b and 1c and the plurality of beam elements 2-1 to 2-5.

With the narrow beam, the FOV is in the range of the self lane and both lanes thereof and, for example, it is possible to detect or track another vehicle (vehicle or motorcycle). With the wide beam, for example, it is possible to detect a walker, a bicycle, or another vehicle at an intersection.

In the multibeam radar apparatus 101 according to the first embodiment, since the high-resolution performance can be maintained without interruption within the FOV, it is possible to cope with the situation depending on the FOV. Therefore, it is possible to arbitrarily set the FOV depending on the application or specification of a radar.

In this manner, in the multibeam radar apparatus 101 according to the first embodiment, it is possible to perform a high-resolution azimuth detection with a high gain and a high efficiency characteristic based on a multibeam and regardless of a small angle or a large angle.

<Conclusion of First Embodiment>

Although it has been stated in the first embodiment that the FMCW system is exemplified as the radar system, the invention is not limited to the radar system and the constitution according to the first embodiment may be applied to another radar system.

Although it has been stated in the first embodiment that the MUSIC method is exemplified as the high-resolution algorithm, the constitution according to the first embodiment may be applied to other techniques such as a linear prediction method or a beam forming method. For example, it is possible to calculate an azimuth angle (angle) using virtual array data and virtual array steering vectors.

As described above, the multibeam radar apparatus 101 according to the first embodiment include Apparatus Constitution 1 to Apparatus Constitution 4 described below.

As Apparatus Constitution 1, the multibeam radar apparatus 101 according to the first embodiment performs the Fourier transformation using the multibeam direction $\theta_m$ expressed by Equation (3) from the data (beam element data y(m)) received through the beam elements 2-1 to 2-M and thus calculates the virtual array data Y(n).

As Apparatus Constitution 2, the multibeam radar apparatus 101 according to the first embodiment acquires the virtual array data with any number of elements and any element interval within the aperture (length) of the dielectric lens 1 when performing the process associated with Apparatus Constitution 1.

As Apparatus Constitution 3, the multibeam radar apparatus 101 according to the first embodiment creates the steering vector a(n, θ) used to perform the azimuth estimation of the virtual array data Y(n) through the use of the Fourier transformation using the multibeam direction $\theta_m$ expressed by Equation (4), similarly to the creation of the virtual array data Y(n). At this time, the same number of elements and element interval used to calculate the virtual array data Y(n) are used.

As Apparatus Constitution 4, the multibeam radar apparatus 101 according to the first embodiment performs a direction estimating process through the use of a high-resolution algorithm, such as the MUSIC method, or the linear prediction method, or the beam forming method using the virtual array data Y(n) and the virtual array steering vector a(n, θ) acquired by Apparatus Constitution 1 to Apparatus Constitution 3.

Since the multibeam radar apparatus 101 according to the first embodiment has Apparatus Constitution 1 to Apparatus Constitution 4, it is possible to perform a high-resolution direction estimating operation without being affected by grating lobes. In the multibeam radar apparatus 101 according to the first embodiment, since data based on the number of array elements N and the element interval d but not depending on the number of original beam elements M is acquired, it is possible to flexibly set the input data, for example, depending on the purpose or the processing efficiency in the high-resolution algorithm or the beam forming method, as an after-process. In the multibeam radar apparatus 101 according to the first embodiment, it is possible to form a small beam width and a large number of beams with the increase in the number of virtual array elements N in the beam forming.

Since the multibeam radar apparatus 101 according to the first embodiment has Apparatus Constitution 3 and thus can create the steering vector $a(n, \theta)$ for the virtual array data $Y(n)$ suitable for the actual multibeam antenna, it is possible to appropriately perform the direction estimation.

Since the multibeam radar apparatus 101 according to the first embodiment includes Apparatus Constitution 1 to Apparatus Constitution 4 and thus can perform the direction estimation with a high resolution, it is possible to reduce the number of beam elements M, compared with the apparatuses according to the related art measuring the angle using only the beam element data. Since the arrangement interval of the beam elements (primary feeds) 2-1 to 2-M has a margin due to the reduction of the number of beam elements M, it is possible to provide the primary feeds with a high gain.

Since the multibeam radar apparatus 101 according to the first embodiment includes Apparatus Constitution 1 to Apparatus Constitution 4, it is possible to cope with various FOVs such as a small-angle FOV and a large-angle FOV, regardless of the FOV. For example, even in a radar (for example, in which the individual beam width is increased to widen the direction) designed for the large angle, since the angle can be measured with a high resolution even with a small number of beam elements M, it is possible to form a multibeam with a high resolution.

In this manner, in the multibeam radar apparatus 101 according to the first embodiment, it is possible to activate the multibeam formation with a high gain and a high efficiency which is a merit of the multibeam system and to markedly improve the resolution of multiple targets and the angle measurement accuracy at the same measurement point, compared with the related art.

Accordingly, in the multibeam radar apparatus 101 according to the first embodiment, since the high separation capability and the high resolution can be added to the multibeam system with a high gain and a high efficiency, it is possible to better detect an object with a small RCS such as a walker or a bicycle at a near position (in the vicinity) and a motorcycle at a distance position, for example, in application to an on-board radar.

Although it has been stated in the first embodiment that all the virtual array elements are included within the lens aperture length (the same aperture length as the dielectric lens 1) of the virtual dielectric lens 1a equivalent to the dielectric lens 1, the length (distance between both ends) of all the virtual array elements when they are linearly arranged may be equal to or substantially equal to the lens aperture length.

On the contrary, a constitution in which a plurality of virtual array elements (for example, one or more elements at both ends) are disposed out of the lens aperture length, that is, a constitution in which all the virtual array elements are not included in the lens aperture length, may be employed. This constitution may be used.

Although it has been stated in the first embodiment that the dielectric lens 1 is used, various other lenses may be used instead of the dielectric lens 1.

Although it has been stated in the first embodiment that the lens (the dielectric lens 1) is provided, a constitution using no lens may be used. In this case, the multibeam transmission and reception is performed through the use of the plurality of beam elements 2-1 to 2-M without using the lens.

Regarding the number M of beam elements 2-1 to 2-M constituting an antenna for transmission and reception, when multiple targets are detected, it is possible to detect the targets corresponding to only the number smaller by 1 than the number of beam elements 2-1 to 2-M.

For example, in the examples shown in FIGS. 10 and 11, the application to 5 element beams. However, the FOV (Field Of View), the beam width, and the number of beam elements can be arbitrarily set depending on the application or specification of a radar. Particularly, in the multibeam system using a lens antenna, they can be flexibly set depending on the shape of the lens and the positions of the primary feeds (beam elements), which is desirable for combination.

[Second Embodiment]
<Constitution Using Unitary Transformation>

In a second embodiment of the invention, the constitution and operation different from those of the first embodiment will be described in detail.

Specifically, the second embodiment is different from the first embodiment, in that a MUSIC method of applying a unitary transformation to virtual array data $Y(n)$ and virtual array steering vectors $a(n, \theta)$ is performed. Non-patent Document 1 (pp. 158-160) can be referred to for the unitary transformation itself.

Figure 12:
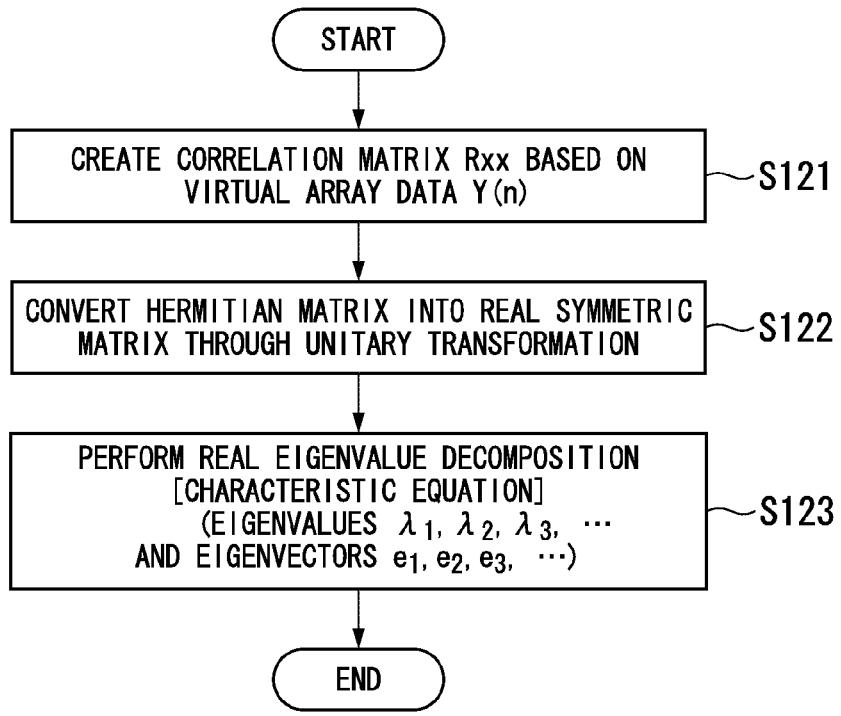
FIG. 12 is a flowchart illustrating an example of the flow of an eigenvalue calculating process including a unitary transformation of a correlation matrix, which is performed by an azimuth detecting unit according to a second embodiment of the invention.

FIG. 12 is a flowchart illustrating an example of the flow of an eigenvalue calculating process including the unitary transformation of a correlation matrix, which is performed by the azimuth detecting unit 57. The processes (the processes of steps S121 to S123) shown in FIG. 12 correspond to the processes of steps S103 to S104 shown in FIG. 8.

The azimuth detecting unit 57 creates a correlation matrix (covariance matrix) $R_{xx}$ based on the virtual array data $Y(n)$ (step S121). This process corresponds to the process of step S103 shown in FIG. 8.

The azimuth detecting unit 57 converts an Hermitian matrix into a real symmetric matrix through the use of the unitary transformation (step S122).

Specifically, it is considered that a phase reference point is set to the center of the array. Accordingly, conjugate centrosymmetry is achieved.

In Equations (6) to (9), a unitary matrix $Q_K(=Q_{2P+1})$ when the matrix order is odd (K=2P+1) is expressed by Equation (6) and a unitary matrix $Q_K(=Q_{2P})$ when the matrix order is even (K=2P) is expressed by Equation (7).

In Equation (6), T on the right-hand shoulder represents the transpose.

$$Q_{2P+1} = \frac{1}{\sqrt{2}} \begin{bmatrix} I_P & 0 & jI_P \\ 0^T & \sqrt{2} & 0^T \\ \prod_P & 0 & -j\prod_P \end{bmatrix} \quad (6)$$

$$Q_{2P} = \frac{1}{\sqrt{2}} \begin{bmatrix} I_P & jI_P \\ \prod_P & -j\prod_P \end{bmatrix} \quad (7)$$

$$I_P = \begin{bmatrix} 1 & \ldots & \ldots & 0 & 0 \\ 0 & 1 & \ldots & 0 & 0 \\ \ldots & & & \ldots & \ldots \\ 0 & \ldots & \ldots & 0 & 1 \end{bmatrix} \quad (8)$$

$$\prod_P = \begin{bmatrix} 0 & \ldots & \ldots & 0 & 1 \\ 0 & \ldots & \ldots & 1 & 0 \\ \ldots & & & \ldots & \ldots \\ 1 & \ldots & \ldots & 0 & 0 \end{bmatrix} \quad (9)$$

A unitary transformation is expressed by Equation (10). In Equation (10), only a real part is calculated.

Regarding the unitary matrix (complex orthogonal matrix) $Q_K$, Equation (11) is established using, a unit matrix $I_K$.

In Equations (10) and (11), H on the right-hand shoulder represents a complex conjugate transpose (Hermitian transpose).

$$R_{xx\_u} = Q_K^H R_{xx} Q_K \quad (10)$$

(Calculation of Only Real Parts)

$$Q_K Q\, Q_K^H = Q_K^H Q_K = I_K \quad (11)$$

In the eigenvalue calculation according to the second embodiment, the correlation matrix can be transformed to a real correction matrix by applying the unitary transformation thereto. Accordingly, the eigenvalue calculation of which the computational load is the heaviest in the subsequent steps can be performed using only real numbers, thereby greatly reducing the computational load.

In this manner, by applying the unitary transformation thereto, it is possible to reduce the computational load of the eigenvalue calculation in the subsequent stage and thus to expect the suppression of signal correlation. Accordingly, although the eigenvalue calculation can be performed using complex numbers in the subsequent stage without performing the transformation to a real correlation matrix through the unitary transformation, it is preferable that the transformation to a real correlation matrix through the unitary transformation be performed.

The azimuth detecting unit 57 calculates eigenvalues $\lambda_1$, $\lambda_2$, $\lambda_3$, ... and eigenvectors $e_1$, $e_2$, $e_3$, ... by performing the real eigenvalue decomposition (step S123).

Here, a characteristic equation for performing the eigenvalue calculation is expressed by Equations (12) and (13).

$$R_{xx\_u} e = \lambda e \quad (12)$$

$$|R_{xx\_u} - \lambda I| = 0 \quad (13)$$

Any solution algorithm can be used for the eigenvalue calculating process in addition to the direct solving of the characteristic equation of Equation (13). For example, repeated calculation type algorithms (convergence type algorithms) such as a Jacobi method, a Householder method, and a QR method may be employed.

Figure 13:
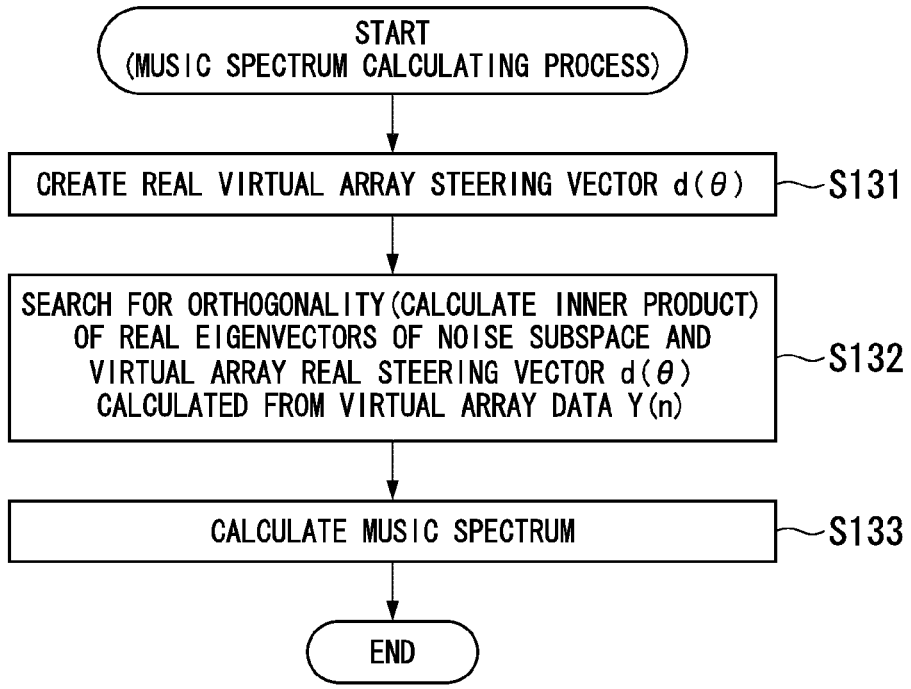
FIG. 13 is a flowchart illustrating an example of the flow of a MUSIC spectrum calculating process including a unitary transformation of a steering vector, which is performed by the azimuth detecting unit according to the second embodiment of the invention.

FIG. 13 is a flowchart illustrating an example of the flow of a MUSIC spectrum calculating process including the unitary transformation of a steering vector, which is performed by the azimuth detecting unit. The processes (the processes of steps S131 to S133) shown in FIG. 13 correspond to the processes (the process of step S106 shown in FIG. 8) of steps S111 to S113 shown in FIG. 9.

In the MUSIC spectrum calculating process, the azimuth detecting unit 57 creates a vector (the real steering vector of a virtual array) $d(\theta)$ obtained by applying the unitary transformation to the virtual array steering vector $a(n, \theta)$ (step S131).

Specifically, it is considered that a phase reference point is set to the center of the array. Accordingly, conjugate centrosymmetry is achieved.

The rear steering vector $d(\theta)$ of the virtual array is expressed by Equation (14). In Equation (14), only real parts are calculated:

$$d(\theta) = W_K^H a(n,\theta) \quad (14)$$

(Calculation of Only Real Parts)

Here, n represents the number of a virtual array element, $\theta$ represents a searching incident angle, K represent the number of elements, $d(\theta)$ represents the real steering vector of a virtual array at the searching incident angle $\theta$, $a(n, \theta)$ represents the n-th steering vector at the searching incident angle $\theta$, and H on the right-handed shoulder represents the complex conjugate transpose (Hermitian transpose).

Then, the azimuth detecting unit 57 searches for the orthogonality of the real eigenvector in a noise subspace calculated from the virtual array data Y(n) and the real steering vector $d(\theta)$ of a virtual array (step S132). In this process, the inner product is used. Specifically, the calculation of the MUSIC method expressed by Equation (15) is performed (for example, refer to Non-patent Document 1 for the general MUSIC method).

$$P_{UM}(\theta) = \frac{d^H(\theta)d(\theta)}{|d(\theta) \cdot e_{L+1}^H|^2 + |d(\theta) \cdot e_{L+2}^H|^2 + \ldots + |d(\theta) \cdot e_K^H|^2} \quad (15)$$
$$= \frac{d^H(\theta)d(\theta)}{d^H(\theta)E_N E_N^H d(\theta)}$$

Here, $\theta$ represents a searching incident angle, $P_{UM}(\theta)$ represents a MUSIC spectrum, $d(\theta)$ represents a real steering vector, $e_i$ represents the i-th eigenvector (where i=L+1 to K), L+1 to K represent the number of a noise subspace, K represents the number of elements, L represents the number of arrival waves (plane waves), $E_N = [e_{L+1}, \ldots, e_K]$, and H on the right-handed shoulder represents a complex conjugate transpose (Hermitian transpose).

In this manner, the azimuth detecting unit 57 acquires the MUSIC spectrum $P_{UM}(\theta)$ through the use of the unitary transformation (step S133).

Specifically, as shown in FIG. 7, the graph 1111 illustrating the relationship between the azimuth angle (angle) and the spectrum intensity can be acquired through the use of the high-resolution algorithm and the angles of multiple targets can be measured with a high resolution on the basis thereof.

In this manner, in the second embodiment, the conjugate centrosymmetry about the center of the virtual array is used. A unitary transformation is applied to the correlation matrix based on the virtual array data Y(n) by the use of Equation (10), and A unitary transformation is applied to the virtual array steering vector $a(n, \theta)$ by the use of Equation (14). The MUSIC spectrum is calculated by Equation (15).

In the second embodiment, since the MUSIC method using the unitary transformation can be carried out on the virtual array data Y(n) and the virtual array steering vector $a(n, \theta)$, it is possible to perform the eigenvalue decomposing process using a real correlation matrix. Therefore, it is possible to achieve functional advantages of a radar of reducing the computational load and more performing the high-resolution process in the measurement point direction of the radar (that is, more performing the MUSIC process for each beat frequency) and to achieve the advantage of reducing the apparatus cost.

<Conclusion of Second Embodiment>

As described above, the multibeam radar apparatus 101 according to the second embodiment includes Apparatus Constitution 5 described below.

As Apparatus Constitution 5, the multibeam radar apparatus 101 according to the second embodiment applies the unitary transformation to the correlation matrix $R_{xx}$ based on the virtual array data Y(n) and the virtual array steering vector $a(n, \theta)$ using the conjugate centrosymmetry of the virtual array and then performs the direction estimation, when performing the direction estimation using the MUSIC method as a high-resolution algorithm through the use of Apparatus Constitution 1 to Apparatus Constitution 4.

Since the multibeam radar apparatus 101 according to the second embodiment includes Apparatus Constitution 5 and thus can perform, the eigenvalue decomposing process using the real correlation matrix, it is possible to achieve functional advantages of reducing the computational load and more performing the high-resolution process for each measurement point and to achieve the advantage of reducing the apparatus cost.

[Third Embodiment]

<Constitutional Example of Multibeam Radar Apparatus>

Figure 14:
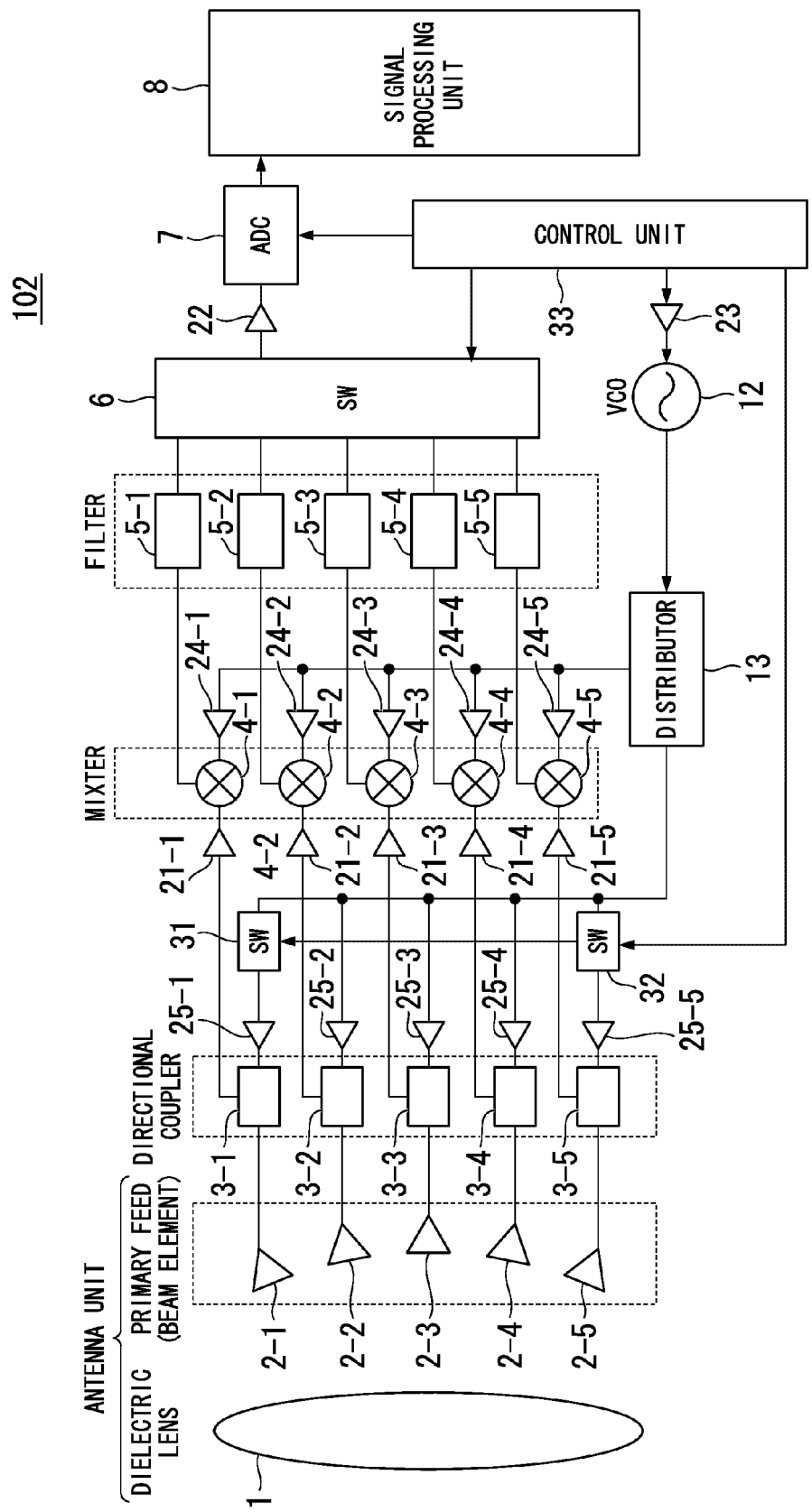
FIG. 14 is a block diagram illustrating the constitution of an on-board multibeam radar apparatus according to a third embodiment of the invention.

FIG. 14 is a block diagram illustrating the constitution of an on-board multibeam radar apparatus 102 according to a third embodiment of the invention.

In the third embodiment, the invention is applied to an FMCW type millimeter wave radar in a multibeam system using a dielectric lens antenna. In the third embodiment, differences from the multibeam radar apparatus 101 according to the first embodiment shown in FIG. 1 will be described in detail and similarities thereto will not be described or will be described in brief.

In the multibeam radar apparatus 102 shown in FIG. 14, the same constituent parts as shown in FIG. 1 are denoted by the same reference numerals.

In the third embodiment, it is assumed that the number M of M beam elements (antenna elements) 2-1 to 2-M as a plurality of primary feeds is 5.

As shown in FIG. 14, the multibeam radar apparatus 102 according to the third embodiment includes a dielectric lens 1, M (=5) beam elements (antenna elements) 2-1 to 2-5 which are a plurality of primary feeds, M (=5) directional couplers 3-1 to 3-5, M (=5) mixers 4-1 to 4-5, M (=5) filters 5-1 to 5-5, an SW (switch) 6, an ADC (A/D (Analog-to-Digital) converter) 7, a signal processing unit 8, a control unit 33, a VCO (Voltage Controlled Oscillator) 12, and a distributor 13.

The multibeam radar apparatus 102 according to the third embodiment includes M (=5) amplifiers 21-1 to 21-5 between the five directional couplers 3-1 to 3-5 and the five mixers 4-1 to 4-5, includes an amplifier 22 between the SW 6 and the ADC 7, includes an amplifier 23 between the control unit 33 and the VCO 12, and includes M (=5) amplifiers 24-1 to 24-5 between the distributor 13 and the five mixers 4-1 to 4-5.

The multibeam radar apparatus 102 according to the third embodiment includes an SW (switch) 31 and an amplifier 25-1 in series between the distributor 13 and the directional coupler 3-1 corresponding the beam element 2-1 at one end.

The multibeam radar apparatus 102 according to the third embodiment includes an SW (switch) 32 and an amplifier 25-5 in series between the distributor 13 and the directional coupler 3-5 corresponding the beam element 2-5 at the other end.

The multibeam radar apparatus 102 according to the third embodiment includes three amplifiers 25-2 to 25-4 between the distributor 13 and the directional couplers 3-2 to 3-4 corresponding the other (three, close to the center) beam elements 2-2 to 2-4.

In the third embodiment, the dielectric lens 1 and the plurality of beam elements 2-1 to 2-5 constitute an antenna unit.

Multibeams capable of simultaneously being transmitted and received are formed by the directional couplers 3-1 to 3-5 connected to the beam elements 2-1 to 2-5, respectively.

<First Constitutional Example and Second Constitutional Example of Signal Processing Unit>

In the multibeam radar apparatus 102 according to the third embodiment, similarly to the first embodiment, the FMCW type signal processing unit 8 shown in FIG. 14 can employ the same constitution as the first constitutional example shown in FIG. 2 or the same constitution as the second constitutional example shown in FIG. 6.

In the third embodiment, a case where the constitution (for example, the azimuth detecting unit 57) shown in FIG. 2 is employed will be described. However, the same is true of the case where the constitution (for example, the azimuth detecting unit 57a) shown in FIG. 6 is employed.

<Points Similar to First Embodiment>

The multibeam radar apparatus 102 according to the third embodiment has the constitution and operation similar to those described in the first embodiment with reference to FIGS. 3, 4, 5, 7, 8, and 9.

<Operational Example of Multibeam Radar Apparatus 102 according to Third Embodiment>

The multibeam radar apparatus 102 according to the third embodiment includes SWs 31 and 32 in the lines between the distributor 13 and the beam elements 2-1 and 2-5 at both ends, as a structural difference from the multibeam radar apparatus 101 according to the first embodiment shown in FIG. 1.

The control unit 33 has a function of switching between the ON and OFF states (enabled/disabled states) of the respective SWs 31 and 32.

In the third embodiment, when the respective SWs 31 and 32 are in the ON state, a signal flows in the corresponding line and the transmission and reception using the corresponding beam elements 2-1 and 2-5 is enabled. On the other hand, when the respective SWs 31 and 32 are in the OFF state, a signal does not flow in the corresponding lines and the transmission and reception using the corresponding beam elements 2-1 and 2-5 is disabled.

The switching between the ON and OFF states of the SWs 31 and 32 by the control unit 33 may be automatically performed by the control unit 33 of the multibeam radar apparatus 102, for example, depending on a predetermined condition (for example, a program), or may be performed when the control unit 33 detects a driver (user) of the vehicle (for example, automobile) mounted with the multibeam radar apparatus 102.

In the third embodiment, by providing the SWs 31 and 32 to two beam elements 2-1 and 2-5 at both ends out of five beam elements 2-1 to 2-5, it is possible to switch between a state where all the five beam elements 2-1 to 2-5 are used for transmission and reception and a state where only three beam elements 2-2 to 2-4 close to the center are used for transmission and reception. Accordingly, in the third embodiment, it is possible to make the variation of the FOV (Field of View) compatible with the high-resolution detection.

<Formation of Multibeam>

It will be described below that the FOV is made to vary by selecting the beam elements 2-1 to 2-5 to be used for transmission and reception and a virtual array corresponding to the FOV is formed to create virtual array data.

Figure 15:
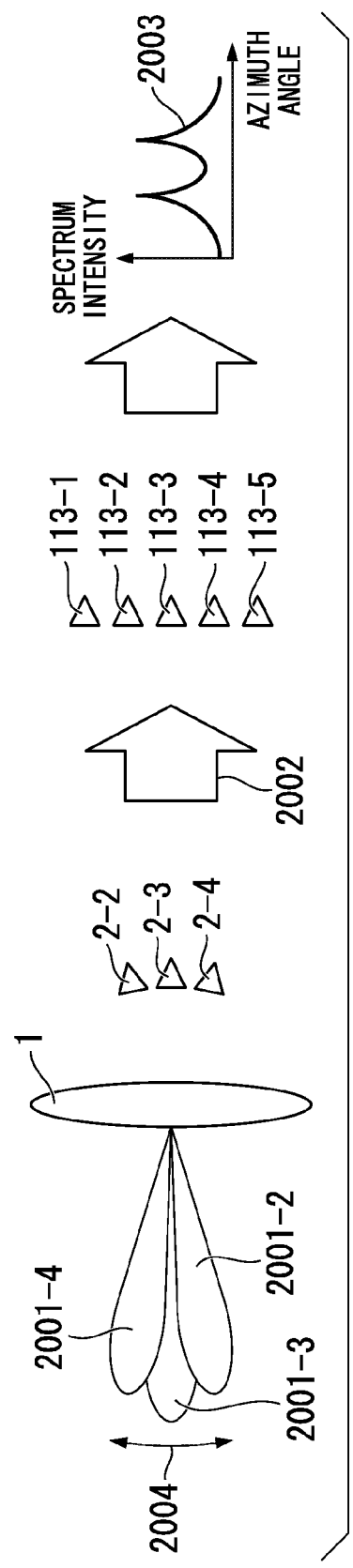
FIG. 15 is a diagram illustrating an example where a multibeam for detecting a distant target is formed.

FIG. 15 is a diagram illustrating an example where a multibeam for detecting a distant target is formed.

In this example, by turning off two SWs 31 and 32 so as to realize a small-angle FOV (Field of View) 2004, two beam elements 2-1 and 2-5 on the outside are disabled out of five beam elements 2-1 to 2-5 and only three beam elements 2-2 to 2-4 close to the center are used for transmission and reception. Accordingly, beams 2001-2 to 2001-4 are formed.

By forming this small-angle FOV 2004, for example, it is possible to detect a target located at a distant position.

The azimuth of the target is estimated by transforming the beam element data y(m) acquired through the three beam elements 2-2 to 2-4 to the virtual array data Y(n) through the use of the Fourier transformation 2002 or transforming the beam element data y(m, θ) at the searching incident angle to the steering vector a(n, θ) through the use of the Fourier transformation.

Here, virtual array elements having, for example, any number of elements and any element interval can be used as the virtual array elements.

In this example, it is assumed that five virtual array elements 113-1 to 113-5 are linearly arranged at a constant interval and it is also assumed that both ends of the virtual array elements 113-1 to 113-5 are arranged to be included in the aperture length of the dielectric lens 1.

In the azimuth estimation, it is possible to detect the azimuth (angle) of a target at a small angle with a high resolution by using the virtual array data.

Specifically, the graph 2003 illustrating the relationship between the azimuth angle (angle) and the spectrum intensity can be acquired through the use of a high-resolution algorithm and the angles of multiple targets can be measured with a high resolution on the basis thereof.

Accordingly, it is possible to detect a target with a small RCS such as a motorcycle.

Figure 16:
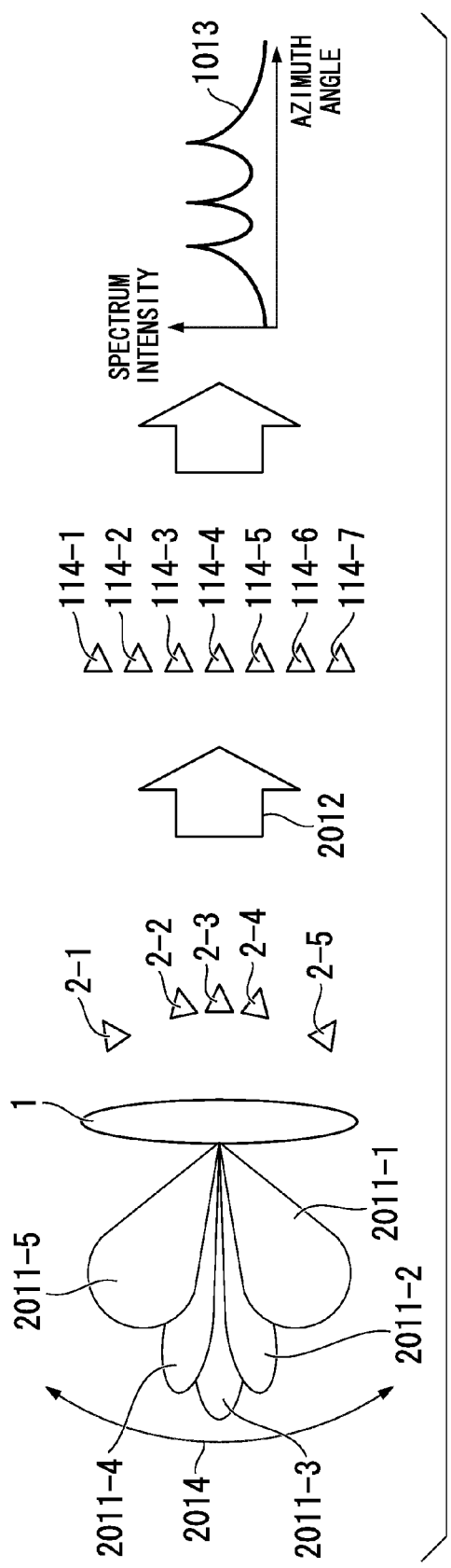
FIG. 16 is a diagram illustrating an example where a multibeam for detecting a near target is formed.

FIG. 16 is a diagram illustrating an example where a multibeam for detecting a near target is formed.

In this example, by turning on two SWs 31 and 32 so as to realize a large-angle FOV (Field of View) 2014, two beam elements 2-1 and 2-5 on the outside are enabled out of the five beam elements 2-1 to 2-5 and all the five beam elements 2-1 to 2-5 are used for transmission and reception. Accordingly, beams 2011-1 to 2011-5 are formed.

By forming this large-angle beams, for example, it is possible to detect a target located at a near position.

The azimuth of the target is estimated by transforming the beam element data y(m) acquired through the five beam elements 2-1 to 2-5 to the virtual array data Y(n) through the use of the Fourier transformation 2012 or transforming the beam element data y(m, θ) at the searching incident angle to the steering vector a(n, θ) through the use of the Fourier transformation.

Here, virtual array elements having, for example, any number of elements and any element interval can be used as the virtual array elements.

In this example, it is assumed that seven virtual array elements 114-1 to 114-7 are linearly arranged at a constant interval and it is also assumed that both ends of the virtual array elements 114-1 to 114-7 are arranged, to be included in the aperture length of the dielectric lens 1.

In the azimuth estimation, it is possible to detect the azimuth (angle) of a target at a large angle with a high resolution by using the virtual array data.

Specifically, the graph 2013 illustrating the relationship between the azimuth angle (angle) and the spectrum intensity can be acquired through the use of a high-resolution algorithm and the angles of multiple targets can be measured with a high resolution on the basis thereof.

Accordingly, it is possible to detect a target with a small RCS such as a walker or a bicycle.

The number of targets which can be detected can be increased.

As shown in FIGS. 15 and 16, in the third embodiment, the beam elements 2-1 to 2-5 to be used for transmission and reception are changed so as to realize an application for a small angle (for example, for detecting a distant target, ±10 deg) shown in FIG. 15 and to realize an application for a large angle (for example, for detecting a near target, ±40 deg) shown in FIG. 16.

With the narrow beam, the FOV is in the range of the self lane and both lanes thereof and, for example, it is possible to detect or track another vehicle (car or motorcycle). With the wide beam, for example, it is possible to detect a walker, a bicycle, or another vehicle at an intersection.

In the third embodiment, various types of virtual array data can be created depending on the transmission and reception states.

For example, as shown in FIG. 15, when a target at a distant position is detected, only the beams of three elements close to the center are transmitted and received and the beams of the two elements on the outside thereof are blocked by the SWs 31 and 32. Accordingly, since narrow multibeams are formed, the resultant virtual array data Y(n) can exclude the detection of an unnecessary reflecting object in the extra range. Accordingly, this is suitable for a high-speed tracking application in an on-board radar.

In this example, since the beams of three elements are transmitted and received, two targets at the same measurement point can be detected by the high-resolution detection using the virtual array data Y(n), but the number of beam elements is preferably set depending on the number of targets to be detected.

As shown in FIG. 16, when a target at a near position (in the vicinity) is detected, the SWs 31 and 32 of the two beam elements on the outside are turned on in addition to the transmission and reception of the beams of the three elements close to the center. Accordingly, since wide multibeams are formed, the detection with a wide FOV is possible using the resultant virtual array data Y(n). Since the beams of the five elements are transmitted and received, four targets at the same measurement point can be detected by the high-resolution detection using the virtual array data Y(n), and thus the number of targets to be detected can be increased. In this manner, since multiple targets at near positions can be detected at a wide field of view, this is suitable for a collision avoiding application in downtown suing an on-board radar.

In this example, since the beams of five elements are transmitted and received, four targets at the same measurement point can be detected by the high-resolution detection using the virtual array data Y(n); however, the number of beam elements is preferably set depending on the number of targets to be detected.

In the multibeam radar apparatus 102 according to the third embodiment, since the high-resolution performance can be maintained without interruption within the FOV, it is possible to cope with the situation depending on the FOV. Therefore, it is possible to arbitrarily set the FOV depending on the application or specification of a radar.

In this manner, in the multibeam radar apparatus 102 according to the third embodiment, it is possible to perform a high-resolution azimuth detection with a high gain and a high efficiency characteristic based on multibeams and regardless of a small angle or a large angle.

The resolution can be arbitrarily set in the example shown in FIG. 15 and in the example shown in FIG. 16.

Figure 17:
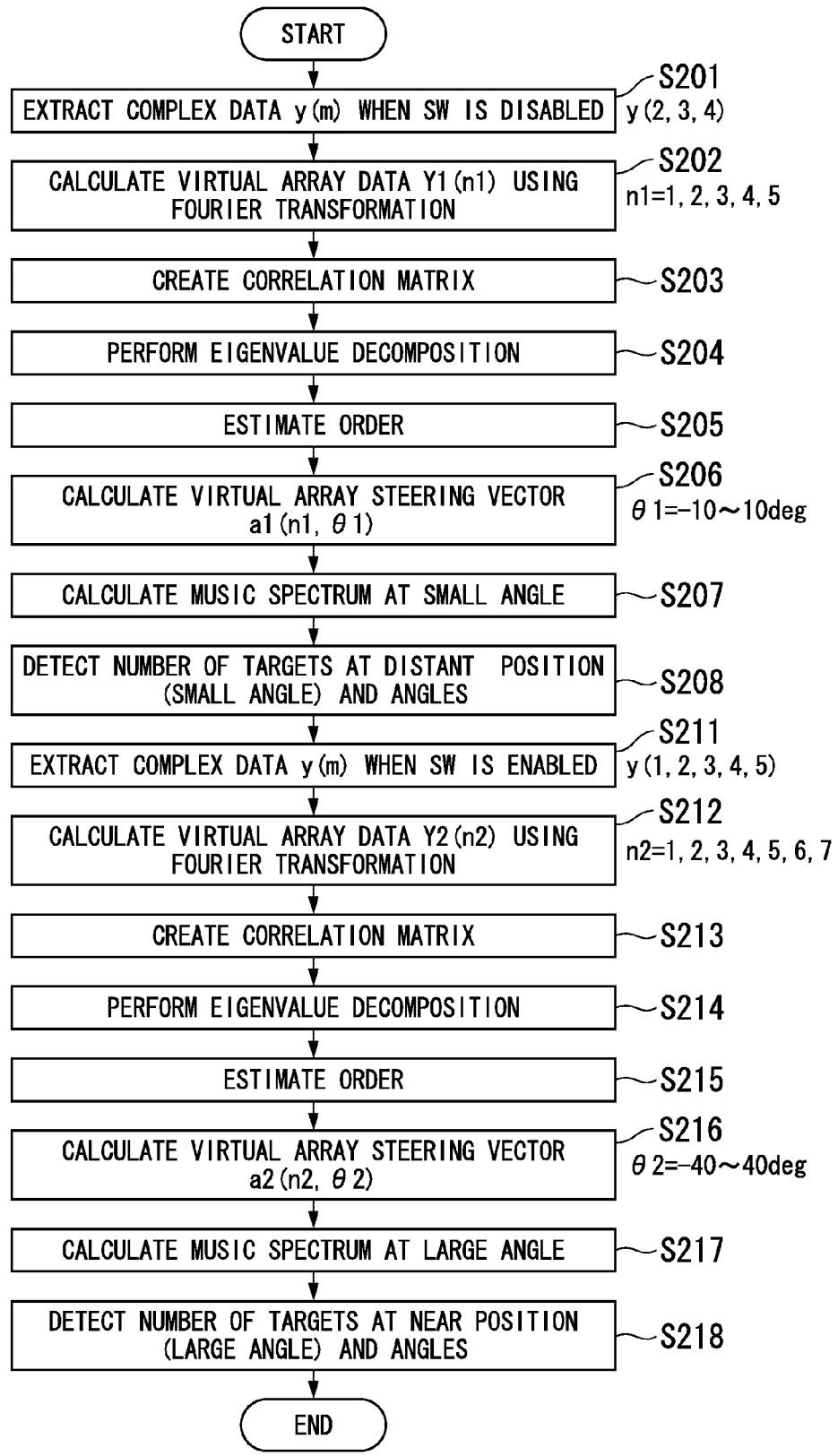
FIG. 17 is a flowchart illustrating an example of the flow of processes performed by a control unit and an azimuth detecting unit according to the third embodiment of the invention.

FIG. 17 is a flowchart illustrating the flow of processes performed by the control unit 33 and the azimuth detecting unit 57. In this example, the MUSIC method is used as a high-resolution algorithm.

In the third embodiment, the control unit 33 changes the FOV between a small angle and a large angle and the azimuth detecting unit 57 detects an azimuth at the corresponding FOV.

Schematically, when the control unit 33 changes the FOV to the small angle, the azimuth detecting unit 57 performs the process of detecting a target through transmission and reception at a small angle (for example, ±10 deg) (steps S201 to S208). When the control unit 33 changes the FOV to the large angle, the azimuth detecting unit 57 performs the process of detecting a target through transmission and reception at the large angle (for example, ±40 deg) (steps S211 to S218).

The flow of processes in the flowchart is repeatedly performed for each beat frequency point at which a target of which the peak is detected is present in each process at the small angle and the large angle. In this manner, since the flow of processes is performed for each target (for example, each of the targets) of which the peak is detected in the measurement point direction, the flow of processes is performed by the number of peaks (for example, a plurality of times) at the small angle and the large angle.

Specific descriptions will be given below.

First, the control unit 33 enables the transmission and reception using three beam elements 2-2 to 2-4 to change the FOV to the small angle by switching the SWs 31 and 32 to the OFF state (disabled state).

The azimuth detecting unit 57 reads the complex data y(m) of CH of a plurality of beam elements 2-2 to 2-4 for one of the beat frequencies at which a target is present and which is extracted by the frequency resolving unit 52 (step S201). In this example, m=2, 3, and 4 is set.

The azimuth detecting unit 57 transforms the read complex data y(m) of CH of a plurality of beam elements 2-2 to 2-4 through the use of the same Fourier transformation equation as expressed by Equation (3) and calculates virtual array data Y1($n1$) (step S202). In this example, n1=1, 2, 3, 4, and 5 is set.

As shown in Equation (3), the virtual array data Y1(n1) in which the number of elements and the element interval are arbitrarily is be obtained from the beam element data y(m) by the input of the actual multibeam direction $\theta_m$ and the set position v(n) of the virtual array element.

In the processes of steps S203 to S208, the virtual array data Y1($n1$) calculated through the process of step S202 is processed using the MUSIC method.

The MUSIC method is generally used and can employ various known techniques (for example, refer to Patent Document 1 for the details of the processes of steps S203 to S208). As shown in FIG. 17, a characterized process is performed in the third embodiment, which is from the related art.

Schematically, the azimuth detecting unit 57 creates a correlation matrix (covariance matrix) (step S203).

Then, the azimuth detecting unit 57 performs an eigenvalue decomposition process to calculate eigenvalues $\lambda_1$, $\lambda_2$, $\lambda_3$, ... and eigenvectors $e_1$, $e_2$, $e_3$, ... (step S204).

The azimuth detecting unit 57 estimates the order (step S205).

In the MUSIC spectrum calculating process, the azimuth detecting unit 57 first creates a steering vector a1($n1$, θ1) of a virtual array (step S206). The steering vector a1($n1$, θ1) is expressed in the same way as in Equation (4). In this example, the searching incident angle θ1 is in the range of −10 to +10 deg.

Subsequently, in the MUSIC spectrum calculating process, the azimuth detecting unit 57 calculates a MUSIC spectrum (step S207).

The azimuth detecting unit 57 detects the number of targets at distant positions (at a small angle) and the angles (step S208).

Then, the control unit 33 enables the transmission and reception using five beam elements 2-1 to 2-5 to change the FOV to the large angle by switching the SWs 31 and 32 to the ON state (enabled state).

The azimuth detecting unit 57 reads the complex data y(m) of CH of the plurality of beam elements 2-1 to 2-5 for one of the beat frequencies at which a target is present and which is extracted by the frequency resolving unit 52 (step S211). In this example, m=1, 2, 3, 4, and 5 is set.

The azimuth detecting unit 57 transforms the read complex data y(m) of CH of the plurality of beam elements 2-1 to 2-5 through the use of the same Fourier transformation equation as expressed by Equation (3) and calculates virtual array data Y2($n2$) (step S212). In this example, n2=1, 2, 3, 4, 5, 6, and 7 is set.

As shown in Equation (3), the virtual array data Y2(n2) in which the number of elements and the element interval are arbitrarily obtained from the beam element data y(m) by the input of the actual multibeam direction $\theta_m$ and the set position v(n) of the virtual array element.

In the processes of steps S213 to S218, the virtual array data Y2($n2$) calculated through the process of step S212 is processed using the MUSIC method.

The MUSIC method is generally used and can employ various known techniques (for example, refer to Patent Document 1 for the details of the processes of steps S213 to S218). As shown in FIG. 17, the characterized process is performed in the third embodiment, which is from the related art.

Schematically, the azimuth detecting unit 57 creates a correlation matrix (covariance matrix) (step S213).

Then, the azimuth detecting unit 57 performs an eigenvalue decomposition process to calculate eigenvalues $\lambda_1$, $\lambda_2$, $\lambda_3$, ... and eigenvectors $e_1$, $e_2$, $e_3$, ... (step S214).

The azimuth detecting unit 57 estimates the order (step S215).

In the MUSIC spectrum calculating process, the azimuth detecting unit 57 first creates a steering vector a2($n2$, θ2) of a virtual array (step S216). The steering vector a2($n2$, θ2) is expressed in the same way as in Equation (4). In this example, the searching incident angle θ2 is in the range of −40 to +40 deg.

Subsequently, in the MUSIC spectrum calculating process, the azimuth detecting unit 57 calculates a MUSIC spectrum (step S217).

The azimuth detecting unit 57 detects the number of targets at distant positions (at a small angle) and the angles (step S218).

<Conclusion of Third Embodiment>

Although it has been stated in the third embodiment that the FMCW system is exemplified as the radar system, the invention is not limited to the radar system and the constitution according to the third embodiment may be applied to another radar system.

Although it has been stated in the third embodiment that the MUSIC method is exemplified as the high-resolution algorithm, the constitution according to the third embodiment may be applied to other techniques such as a linear prediction method or a beam forming method. For example, it is possible to calculate an azimuth angle (angle) using virtual array data and virtual array steering vectors.

As described above, the multibeam radar apparatus 102 according to the third embodiment includes Apparatus Constitution 6 to Apparatus Constitution 8 described below.

As Apparatus Constitution 6, the multibeam radar apparatus 102 according to the third embodiment controls the transmission and reception of the beam elements 2-1 to 2-5, combines arbitrary beam elements out of the beam elements 2-1 to 2-5, and creates a plurality of virtual array data Y1($n1$) and Y2($n2$), when creating the virtual array data.

As Apparatus Constitution 7, the multibeam radar apparatus 102 according to the third embodiment creates steering vectors a1($n1$, θ1) and a2($n2$, θ2) corresponding to a plurality of virtual array data Y1($n1$) and Y2($n2$) created through the arrangement of beam elements under the control of transmission and reception in Apparatus Constitution 6, as for the virtual array steering vectors.

As Apparatus Constitution 8, the multibeam radar apparatus 102 according to the third embodiment uses a high-resolution algorithm, such as the MUSIC method or the linear prediction method, or the direction estimating process such as the beam forming process by the use of the virtual array data Y1($n$1) and Y2($n$2) and the virtual array steering vectors a1($n$1, $\theta$1) and a2($n$2, $\theta$2) acquired through the use of Apparatus Constitution 6 to Apparatus Constitution 7.

Since the multibeam radar apparatus 102 according to the third embodiment includes Apparatus Constitution 6 to Apparatus Constitution 8, a plurality of virtual array data Y1($n$1) and Y2($n$2) with various FOVs can be created by a single radar apparatus and it can thus be applied to the detection of a target for different purposes such as a small angle and a large angle. For example, a small angle is set so as not to detect unnecessary reflecting objects in an extra range when detecting a target at a distant position, and a large angle is set so as to detect more targets within the sample measurement point when detecting a target at a near position (in the vicinity). That is, it is possible to enable the detection control at a small angle and a large angle, thereby achieving the simplicity of an apparatus and the superiority in cost.

In the multibeam radar apparatus 102 according to the third embodiment, since the resolution in the high-resolution process using the plurality of virtual array data Y1($n$1) and Y2($n$2) can be set to arbitrary value, it is possible to set an appropriate resolution suitable for the small-angle/large-angle detection.

Accordingly, in the multibeam radar apparatus 102 according to the third embodiment, since the high separation capability, the high resolution capability, and the FOV changing function can be added to the multibeam system with a high gain and a high efficiency, it is possible to better detect an object with a small RCS such as a walker or a bicycle nearby (in the vicinity) and a motorcycle at a distance, for example, in application to on-board radar.

In the multibeam radar apparatus 102 according to the third embodiment, since it is possible to perform the azimuth detection processes with various types (for example, two types) of FOVs by the use of a signal apparatus, the processing result can be sent to a vehicle control unit, for example, depending on the application. For example, when an application of fixing a distant target and a near target by switching between the distant detection and the near detection within a control period of 100 ms and controlling both the distant detection and the near detection is used, the azimuth estimating processes at both a small angle and a large angle can be performed in a period of 100 ms.

In this manner, in the multibeam radar apparatus 102 according to the third embodiment, it is possible to activate the merits of the multibeam system (the multibeam formation with a high gain and a high efficiency), to markedly improve the resolution of multiple targets and the angle measurement accuracy at the same measurement point, and to perform a plurality of detection functions with various FOVs through the use of a single radar apparatus.

Although it has been stated in the third embodiment that all the virtual array elements are included within the lens aperture length (the same aperture length as the dielectric lens 1) of the virtual dielectric lens equivalent to the dielectric lens 1, the length (distance between both ends) of all the virtual array elements when they are linearly arranged may be equal to or substantially equal to the lens aperture length.

On the contrary, a constitution in which a plurality of virtual array elements (for example, one or more elements at both ends) are disposed out of the lens aperture length, that is, a constitution in which all the virtual array elements are not included within the lens aperture length, may be employed. This constitution may be used.

Although it has been stated in the third embodiment that the dielectric lens 1 is used, various other lenses may be used instead of the dielectric lens 1.

Although it has been stated in the third embodiment that the lens (the dielectric lens 1) is provided, a constitution using no lens may be used. In this case, the multibeam transmission and reception is performed through the use of the plurality of beam elements 2-1 to 2-M (M=5 in the third embodiment) without using the lens.

Regarding the number M of beam elements 2-1 to 2-M constituting an antenna for transmission and reception, when multiple targets are detected, it is possible to detect the targets corresponding to only the number (M−1) smaller by 1 than the number of beam elements 2-1 to 2-M.

Although it has been stated in the third embodiment that the invention is applied to the five beam elements, the FOV (Field of View) changing type, the beam width, the total number of beam elements, the number of beam elements to be selected, selection of the beam element on which the SW is provided to enable switching between the ON and OFF states, and the like may be arbitrarily determined depending on the application or specification of a radar. Particularly, in the multibeam system using a lens antenna, they can be flexibly set depending on the shape of the lens and the positions of the primary feeds (beam elements), which is desirable for combination.

For example, although it has been stated in the third embodiment that the SW is provided to the beam elements from the outermost beam element to the central beam element out of the plurality of beam elements 2-1 to 2-M and the SW is not provided to only the central beam element or the central beam element and the beam elements close to the central beam element, a constitution in which the SW may be provided to all the beam elements 2-1 to 2-M may be used.

[Fourth Embodiment]

<Constitution using Unitary Transformation>

In a fourth embodiment of the invention, the constitutions and operations different from those of the third embodiment will be described in detail.

Specifically, the fourth embodiment is different from the third embodiment, in that the MUSIC method of applying a unitary transformation to virtual array data Y1($n$1) and Y2($n$2), and to virtual array steering vectors a1($n$1, $\theta$1) and a2($n$2, $\theta$2).

Here, the constitution using the unitary transformation in the fourth embodiment is the same as described in the second embodiment.

The multibeam radar apparatus 102 according to the fourth embodiment has the constitutions and operations similar to those described with reference to FIGS. 12 and 13 in the second embodiment.

<Conclusion of Fourth Embodiment>

As described above, the multibeam radar apparatus 102 according to the fourth embodiment includes Apparatus Constitution 9 described below.

As Apparatus Constitution 9, the multibeam radar apparatus 102 according to the fourth embodiment first applied the unitary transformation to the correlation matrices and to the virtual array steering vectors a1($n$1, $\theta$1) and a2($n$2, $\theta$2) based on the virtual array data Y1($n$1) and Y2($n$2) using the conjugate centrosymmetry of the virtual array and then perform the direction estimation, when performing the direction estimation using the MUSIC method as the high-resolution algorithm through the use of Apparatus Constitution 6 to Apparatus Constitution 8.

Since the multibeam radar apparatus 102 according to the fourth embodiment includes Apparatus Constitution 9 and thus can perform the eigenvalue decomposing process on the real correlation matrix, it is possible to reduce the computational load, to achieve the advantage of reducing the computational load due to the plurality of virtual array data Y1($n1$) and Y2($n2$) and the virtual array steering vector a1($n1$, $\theta1$) and a2($n2$, $\theta2$), and to reduce the apparatus cost.

[Description of Related Art]

The related art of the invention will be described below.

For reference, the details of the related art is based on the contents of "DOA Estimation with Super Resolution Capabilities using Multi-beam Antenna of Dielectric Lens", Ide, Kuwabara (Engineering Department of Shizuoka University), Kamo, and Kanemoto (Honda Elesys Co., Ltd.), General Conference of Institute of Electronics, Information and Communication Engineers, Fundamental and Boundary Lecture Essays, pp. 261.

This related art may be used in the invention or may not be used if not necessary.

Title: DOA Estimation with super resolution capabilities using a multi-beam antenna of the dielectric lens 1. Introduction The arrival direction estimation of an element space is difficult to use under environments of a low gain of an antenna element and a low SNR. The use of a beam space can be considered as a solution thereto. The inventors applied the beam space to the pre-process of removing unnecessary waves already [1]. The DOA estimation with super resolution capabilities using a multibeam dielectric lens antenna [2] will be reviewed.

2. Operational Principle

Figure 18:
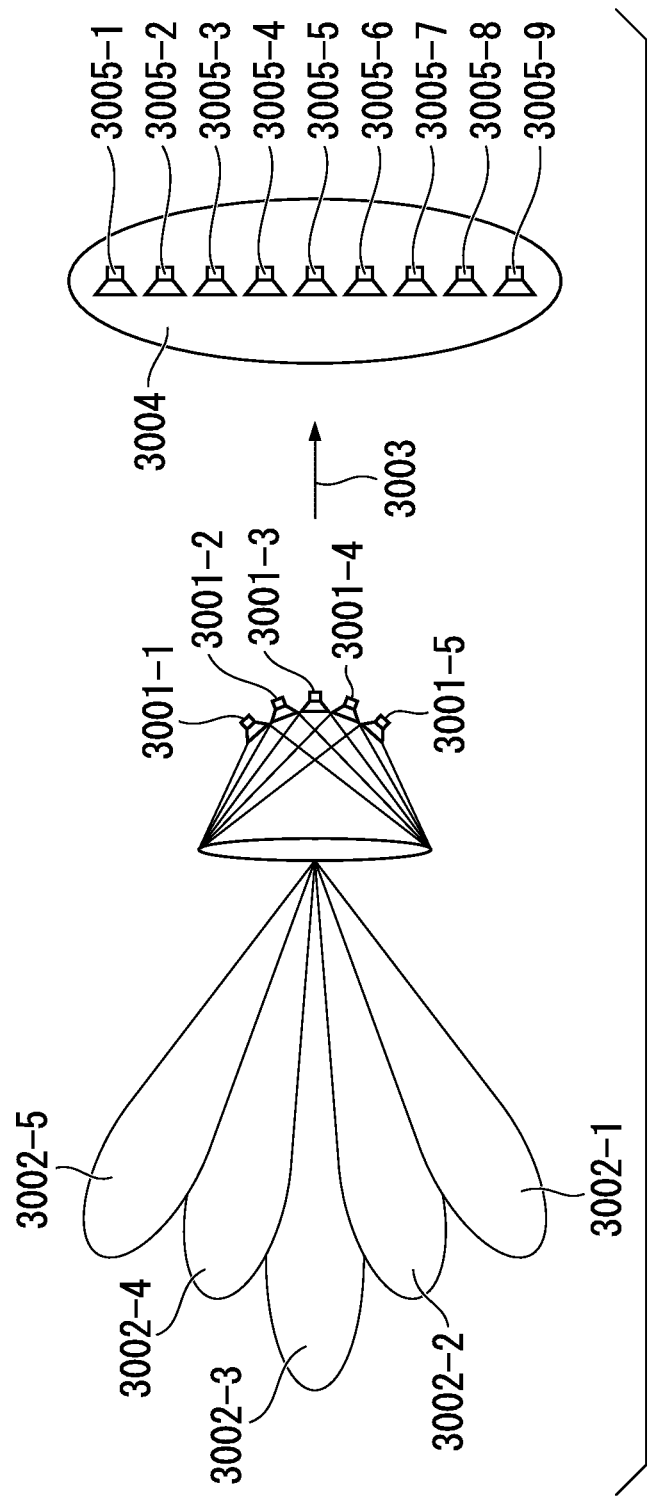
FIG. 18 is a diagram illustrating the principle of estimating an arrival direction with an ultrahigh resolution using a multibeam dielectric lens antenna.

The operational principle is shown in FIG. 18. Horizontal multibeams are generated by the dielectric lens. The aperture distribution of the lens surface and the primary feed pattern have the Fourier transformation relationship and the steering vector of a virtual array antenna in the aperture distribution is created from this relationship. The signal received through the primary feed array is transformed to the output of the virtual array antenna through the Fourier transformation. The covariance matrix of the output of the virtual array antenna is estimated and the arrival direction is estimated using the MUSIC method.

3. Simulation

A dielectric lens antenna generating horizontal multibeam patterns of −30°, −15°, 0°, 15°, and 30° was designed based on Document [1].

Figure 19:
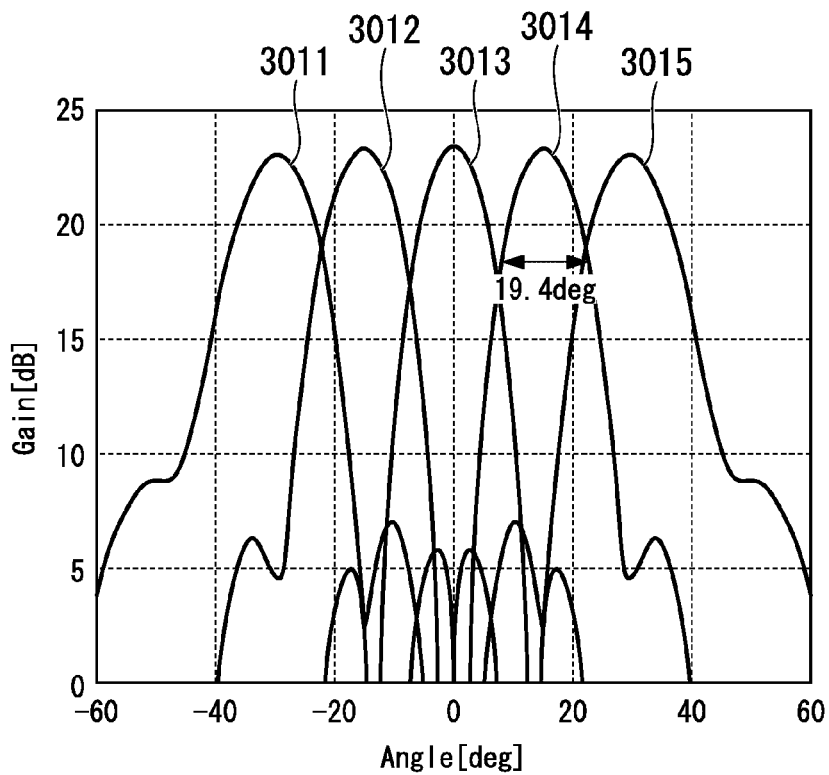
FIG. 19 is a diagram illustrating horizontal beam patterns.
Figure 20:
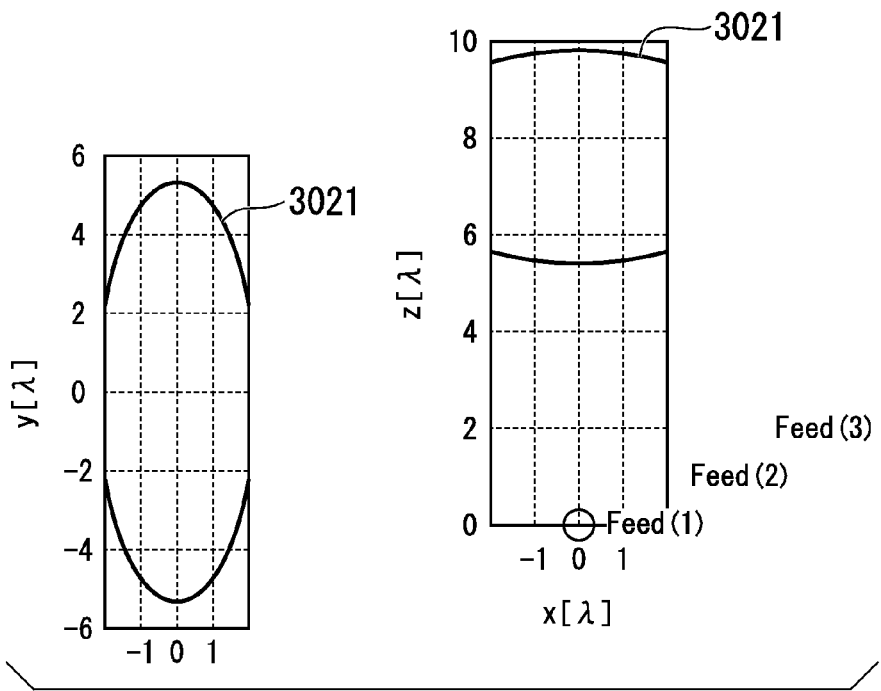
FIG. 20 is a diagram illustrating an outline of a lens.

The primary feeds were approximated to a $\cos^n\theta$ pattern (E face n=2, H face n=3) and the beam width was designed in E face 6° and H face 20°. The resultant directivity, the lens shape, and the focal position are shown in FIGS. 19 and 20. The number of elements of the virtual array antenna was set to 9 and two signals not correlated with each other were incident thereon.

Figure 21:
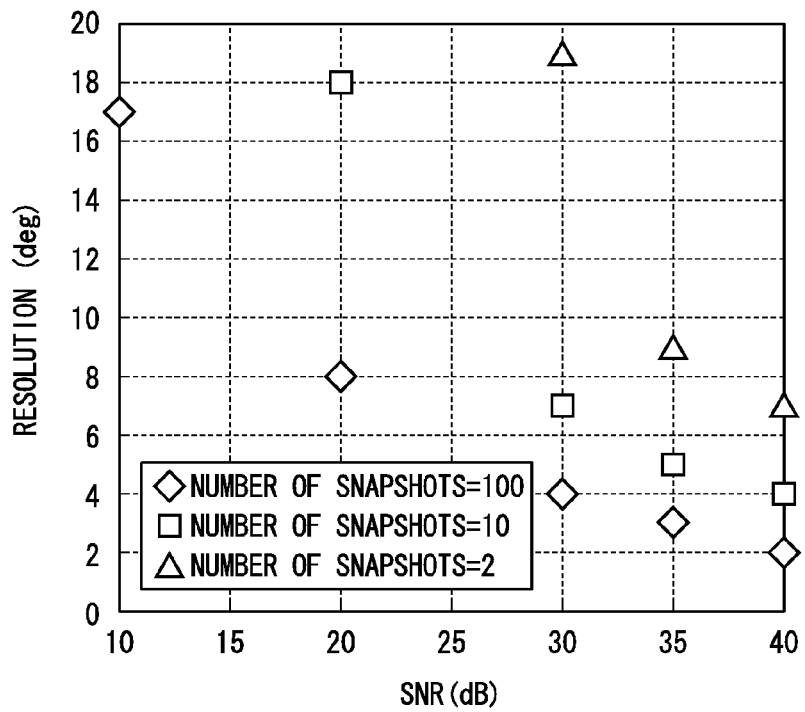
FIG. 21 is a diagram illustrating the relationship of the SNR, the number of snapshots, and the resolution.
Figure 22:
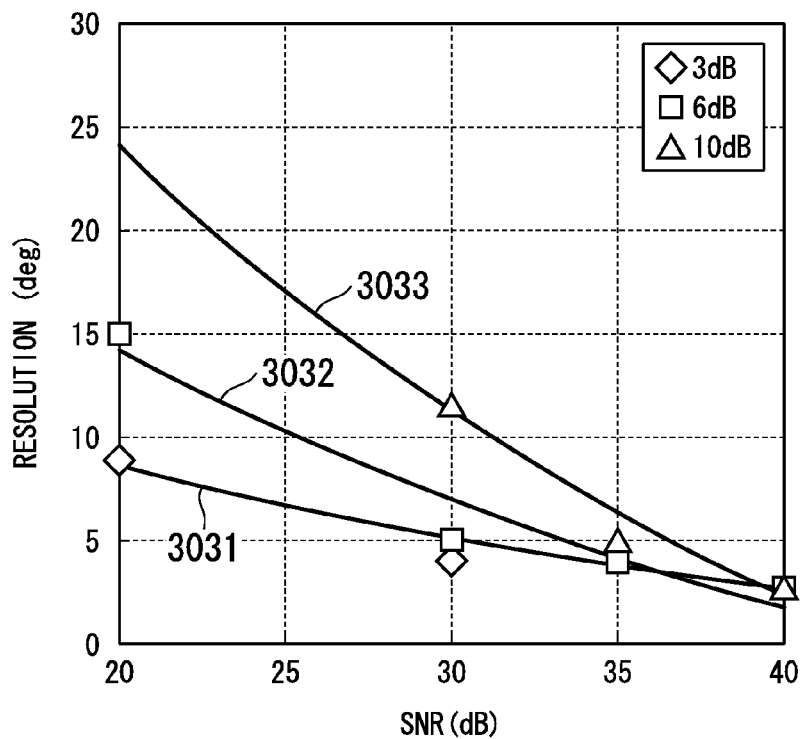
FIG. 22 is a diagram of a graph illustrating the relationship of the SNR, the DUR, and the resolution.

The minimum angular separation of the two signals was estimated using the number of snapshots and the SNR as parameters. The minimum angular separation when the number of snapshots was fixed to 100 and the DUR (Desire and Undesire Ratio) of the arriving signals was changed was estimated. The results are shown in FIGS. 21 and 22. Examples of the MUSIC spectrum are shown, in FIGS. 23 and 24.

4. Conclusion

The super resolution capability in the arrival direction estimation using the multibeam dielectric lens antenna and the MUSIC method was checked through the use of a computer simulation.

REFERENCES

[1] Japanese Patent No. 4098311 and Japanese Patent No. 4098318

[2] IEEE Trans. AP Vol. 57, No. 1, pp. 57-63, 2009

Explanation of FIGS. 18 to 24

FIG. 18 is a diagram illustrating the principle of the arrival direction estimation with a super resolution using a multibeam dielectric lens antenna.

Five beam elements 3001-1 to 3001-5 and five beams 3002-1 to 3002-5 are shown. As the result of the Fourier transformation 3003 thereof, a virtual dielectric lens 3004 and nine virtual array elements 3005-1 to 3005-9 are shown.

FIG. 19 is a diagram illustrating horizontal beam patterns.

In the graph, the horizontal axis represents the angle [deg] and the vertical axis represents the gain [dB].

Five beam patterns 3011 to 3015 are shown.

FIG. 20 is a diagram illustrating the profile of a lens.

The profile of a lens 3021 is shown. Specifically, x[$\lambda$], y[$\lambda$], and z[$\lambda$] are shown.

FIG. 21 is a diagram illustrating the relationship of the SNR, the number of snapshots, and the resolution.

The horizontal axis represents the SNR [dB] and the vertical axis represents the resolution [degree].

FIG. 22 showing examples where the number of snapshots is 100, 10, and 2 is a diagram of a graph illustrating the relationship of the SNR, the DUR, and the resolution.

In the graph; the horizontal axis represents the SNR [dB] and the vertical axis represents the resolution [degree].

A graph line 3031 corresponding to the DUR of 3 dB, a graph line 3032 corresponding to the DUR of 6 dB, and a graph line 3033 corresponding to the DUR of 10 dB are shown.

Figure 23:
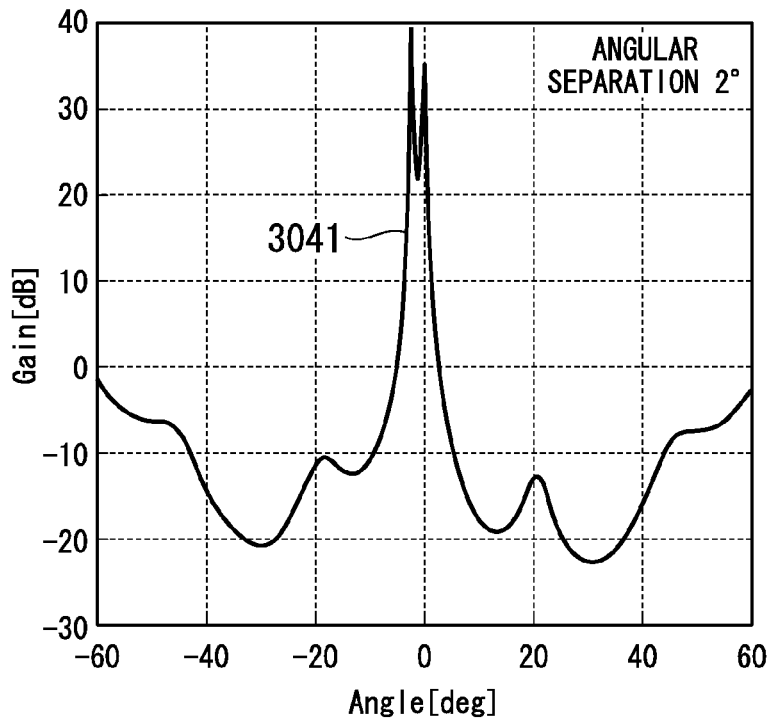
FIG. 23 is a diagram illustrating an example of a MUSIC spectrum.

FIG. 23 is a diagram illustrating an example of the MUSIC spectrum.

In this example, the angular separation is 2°. In addition, SNR=40 dB, number of snapshots=100, and DUR=0 dB are set.

In the graph, the horizontal axis represents the angle [deg] and the vertical axis represents the gain [dB].

A music spectrum 3041 is shown.

Figure 24:
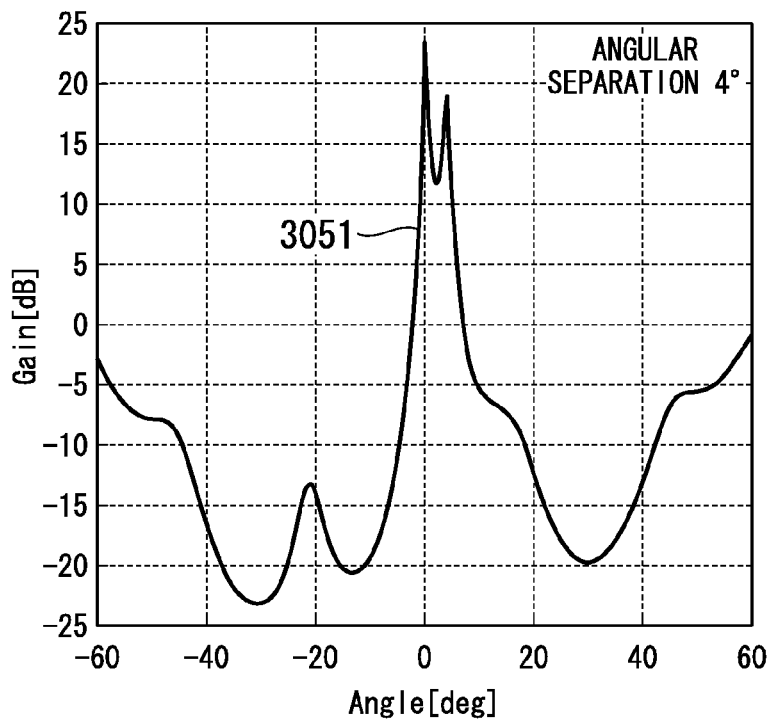
FIG. 24 is a diagram illustrating an example of a MUSIC spectrum.

FIG. 24 is a diagram illustrating an example of the MUSIC spectrum.

In this example, the angular separation is 4°. In addition, SNR=40 dB, number of snapshots=100, and DUR=0 dB are set.

In the graph, the horizontal axis represents the angle [deg] and the vertical axis represents the gain [dB].

A music spectrum 3051 is shown.

<Conclusion of Embodiments>

It has been stated in the above-mentioned embodiments that the multibeam radar apparatus 101 shown in FIG. 1 or the multibeam radar apparatus 102 shown in FIG. 14 is provided as an on-board radar apparatus to a vehicle or the like, the multibeam radar apparatus may be provided to any other moving object.

Programs for realizing the functions of the control unit 11 or the signal processing unit 8 shown in FIG. 1 and the functions of the control unit 33 or the signal processing unit 8 shown in FIG. 14 may be recorded on a computer-readable recording medium and the programs recorded on the recording medium may be read and executed by a computer system to perform the processes. The "computer system" includes an OS (Operating System) and hardware such as peripherals. The "computer system" also includes a WWW system having a homepage provision environment (or display environment). The "computer-readable recording medium" includes a portable medium such as a flexible disc, a magneto-optical disc, a ROM, or a CD-ROM or a storage device such as a hard disk built in the computer system. The "computer-readable recording medium" also includes a device storing a program for a predetermined time, like an internal volatile memory (RAM (Random Access Memory)) of a computer system serving as a server or a client when the programs are transmitted through a network such as the Internet or a communication line such as a telephone line.

The programs may be transmitted from a computer system having the programs stored in a storage device thereof or the like to another computer system through a transmission medium or by carrier waves in the transmission medium. The "transmission medium" which transmits a program means a medium having a function of transmitting information and examples thereof include a network (communication network) such as the Internet and a communication link (communication line) such as a telephone line. The program may realize some of the above-described functions. The program may realize the above-described functions in combination with a program already recorded in a computer system, that is, the program may be a differential file (differential program).

While the embodiments of the invention have been described with reference the accompanying drawings, the specific constitutions are not limited to the embodiments, and may include other designs which do not depart from the concept of the invention.

What is claimed is:

1. A method of searching for an incident angle of an incoming wave, for use in a multibeam radar apparatus, comprising:
   transmitting a transmission wave through a plurality of beam elements defining an antenna;
   receiving the incoming wave, which has been reflected from a target in response to the transmission wave being transmitted by the plurality of the beam elements;
   mixing the incoming wave with the transmission wave to generate beat signals;
   sending the beat signals to a processor;
   creating a plurality of steering vectors $a(n, \theta)$ for a plurality of $\theta$ at the processor using an equation (4) where n represents a number of virtual array elements and $\theta$ represents a searching incident angle; and
   searching for the incident angle of the incoming wave using the plurality of steering vectors $a(n, \theta)$; wherein
   M is a total number of the plurality of beam elements, $y(m, \theta)$ is m-th beam element data at the searching incident angle, $\theta$, $a(n, \theta)$ is a steering vector at the searching incident angle $\theta$, $u(m)=2\pi \sin \theta_m$, $\theta_m$ is a direction of an m-th multibeam, and $v(n)$ is a position of the n-th virtual array element $$a(n, \theta) = \frac{1}{2\pi} \sum_{m=1}^{M} y(m, \theta) e^{-ju(m)v(n)}. \quad (4)$$

2. The method of searching for an incident angle of an incoming wave of claim 1, wherein the antenna includes a lens which the transmission wave and the incoming wave pass through.

3. A non-transitory computer readable medium having instructions stored thereon, which, when executed by a computer, cause the computer to perform a method of searching for an incident angle of an incoming wave, for use in a multibeam radar apparatus, the method comprising:
   transmitting a transmission wave through a plurality of beam elements defining an antenna;
   receiving the incoming wave, which has been reflected from a target in response to the transmission wave being transmitted by the plurality of the beam elements;
   mixing the incoming wave with the transmission wave to generate beat signals;
   sending the beat signals to a processor;
   creating a plurality of steering vectors $a(n, \theta)$ for a plurality of $\theta$ at the processor using an equation (4) where n represents a number of virtual array elements and $\theta$ represents a searching incident angle; and
   searching for the incident angle of the incoming wave using the plurality of steering vectors $a(n, \theta)$; wherein
   M represents a total number of the beam elements, $y(m, \theta)$ represents m-th beam element data at the searching incident angle $\theta$, $a(n, \theta)$ represents a steering vector at the searching incident angle $\theta$, $u(m)=2\pi \sin \theta_m$, $\theta_m$ represents the direction the m-th multibeam, and $v(n)$ represents the position of the n-th virtual array element $$a(n, \theta) = \frac{1}{2\pi} \sum_{m=1}^{M} y(m, \theta) e^{-ju(m)v(n)}. \quad (4)$$

* * * * *